United States Patent
Tanno et al.

(10) Patent No.: US 10,603,965 B2
(45) Date of Patent: Mar. 31, 2020

(54) PNEUMATIC TIRE, AND METHOD OF MANUFACTURING PNEUMATIC TIRE

(71) Applicant: The Yokohama Rubber Co., LTD., Minato-ku, Tokyo (JP)

(72) Inventors: Atsushi Tanno, Hiratsuka (JP); Jun Matsuda, Hiratsuka (JP); Yuji Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 783 days.

(21) Appl. No.: 14/905,931

(22) PCT Filed: Aug. 18, 2014

(86) PCT No.: PCT/JP2014/071590
§ 371 (c)(1),
(2) Date: Jan. 18, 2016

(87) PCT Pub. No.: WO2015/025824
PCT Pub. Date: Feb. 26, 2015

(65) Prior Publication Data
US 2016/0159167 A1    Jun. 9, 2016

(30) Foreign Application Priority Data

Aug. 21, 2013 (JP) .................................. 2013-171389

(51) Int. Cl.
*B60C 9/18* (2006.01)
*B60C 19/00* (2006.01)
(Continued)

(52) U.S. Cl.
CPC .......... *B60C 19/00* (2013.01); *B29D 30/0601* (2013.01); *B29D 30/08* (2013.01);
(Continued)

(58) Field of Classification Search
CPC ........... B60C 9/18; B60C 9/1821; B60C 9/00; B60C 9/0064; B60C 9/0007; B60C 19/00; B60C 2019/008
See application file for complete search history.

(56) References Cited

U.S. PATENT DOCUMENTS 3,610,309 A * 10/1971 Fletcher ................ B60C 9/1821
                                                          152/209.4
3,783,926 A *  1/1974 de Zarauz ............. B29D 30/20
                                                          152/556
(Continued)

FOREIGN PATENT DOCUMENTS

EP         0 514 823         11/1992
EP         1526005       *   4/2005
(Continued)

OTHER PUBLICATIONS

Machine translation of JP 2004-268863, 2004.*
(Continued)

*Primary Examiner* — Justin R Fischer
(74) *Attorney, Agent, or Firm* — Thorpe North & Western

(57) ABSTRACT

A pneumatic tire (1) is provided with a cylindrical annular structure (10) that is disposed around the rotational axis and that has an outer surface and an inner surface, a carcass portion (12) at least a part of which is disposed on an outer side of the annular structure in a direction parallel to the rotational axis, the carcass portion (12) having a cord covered by rubber, a rubber layer (11) at least a part of which is disposed so as to face the outer surface of the annular structure, the rubber layer (11) including a tread portion, and a fiber (2) disposed between the annular structure and the rubber layer so as to suppress generation of a gas space between the annular structure and the rubber layer.

23 Claims, 14 Drawing Sheets

(51) Int. Cl.
*B29D 30/30* (2006.01)
*B29D 30/08* (2006.01)
*B29D 30/06* (2006.01)
*B60C 9/02* (2006.01)
*B60C 11/00* (2006.01)
*B29K 105/00* (2006.01)

(52) U.S. Cl.
CPC ......... *B29D 30/30* (2013.01); *B29D 30/3014* (2013.01); *B60C 9/02* (2013.01); *B60C 9/18* (2013.01); *B60C 11/00* (2013.01); *B29D 2030/088* (2013.01); *B29D 2030/3071* (2013.01); *B29K 2105/258* (2013.01); *B60C 2009/1878* (2013.01)

(56) References Cited

U.S. PATENT DOCUMENTS

| | | | |
|---|---|---|---|
| 5,221,382 A | | 6/1993 | Sid-Ahmed |
| 5,417,266 A | * | 5/1995 | Janus ..................... B60C 9/18 152/200 |
| 5,817,197 A | * | 10/1998 | Mani ...................... B60C 9/18 152/199 |
| 6,254,989 B1 | | 7/2001 | Sid-Ahmed |
| 2012/0160387 A1 | | 6/2012 | Tanno et al. |
| 2013/0008574 A1 | | 1/2013 | Kodama et al. |
| 2014/0110034 A1 | | 4/2014 | Tanno et al. |

FOREIGN PATENT DOCUMENTS

| | | | |
|---|---|---|---|
| GB | 1061564 | * | 3/1967 |
| GB | 2002699 | * | 2/1979 |
| JP | H02-299903 | | 12/1990 |
| JP | H05-178003 | | 7/1993 |
| JP | 2002-2220 | * | 1/2002 |
| JP | 2003-118323 | | 4/2003 |
| JP | 2003-191712 | * | 7/2003 |
| JP | 2004-268863 | * | 9/2004 |
| JP | 2010-047103 | | 3/2010 |
| JP | 2010-173617 | | 8/2010 |
| JP | 2012-006452 | | 1/2012 |
| JP | 2012-140089 | | 7/2012 |
| JP | 2013-001193 | | 1/2013 |
| JP | 2013-159272 | | 8/2013 |
| WO | WO 2011/162266 | | 12/2011 |
| WO | WO 2012/173121 | | 12/2012 |

OTHER PUBLICATIONS

Machine translation of JP 2002-2220, 2002.*
International Search Report for International Application No. PCT/JP2014/071590 dated Oct. 14, 2014, 4 pages, Japan.

* cited by examiner

| | COMPARATIVE EXAMPLE 1 | COMPARATIVE EXAMPLE 2 | WORKING EXAMPLE 1 | COMPARATIVE EXAMPLE 3 |
|---|---|---|---|---|
| PRESENCE OF FIBER | NO | YES | YES | YES |
| INTER-FIBER INTERVAL | - | 2mm | 15mm | 110mm |
| ADHESIVE FORCE | 100 | 87 | 117 | 96 |

PNEUMATIC TIRE, AND METHOD OF MANUFACTURING PNEUMATIC TIRE

TECHNICAL FIELD

The present technology relates to a pneumatic tire, and a method of manufacturing a pneumatic tire.

BACKGROUND

With respect to a pneumatic tire, a pneumatic tire is known that is provided with a cylindrical annular structure, a rubber layer adjacent to the annular structure, and a carcass portion adjacent to the annular structure, as disclosed in Japanese Unexamined Patent Application Publication Nos. 2012-006452A and 2013-001193A, for example.

For example, when a gas space, such as entrapped air, is generated between the annular structure and the rubber layer, there is a possibility that poor bonding may occur between the annular structure and the rubber layer. Further, when the gas space is generated between the annular structure and the carcass portion, there is a possibility that poor bonding may occur between the annular structure and the carcass portion. As a result, there is a possibility that performance of the pneumatic tire may deteriorate.

SUMMARY

The present technology provides a pneumatic tire capable of suppressing performance deterioration and a method of manufacturing the pneumatic tire.

A pneumatic tire according to the present technology is provided with: a cylindrical annular structure that is disposed around a rotational axis and that has an outer surface and an inner surface; a carcass portion at least a part of which is disposed on an outer side of the annular structure in a direction parallel to the rotational axis, the carcass portion having a cord covered by rubber; a rubber layer at least a part of which is disposed so as to face the outer surface of the annular structure, the rubber layer including a tread portion; and a fiber disposed between the annular structure and the rubber layer so as to suppress generation of a gas space between the annular structure and the rubber layer.

According to the present technology, when the rubber layer is disposed so as to face the outer surface of the annular structure, as a result of the fiber being disposed between the annular structure and the rubber layer, the generation of the gas space between the annular structure and the rubber layer is suppressed. Due to the fiber, gas between the annular structure and the rubber layer is diffused between the annular structure and the rubber layer. For example, due to the fiber, the gas between the annular structure and the rubber layer spreads evenly between the annular structure and the rubber layer, and this inhibits the gas from stagnating in one section. Further, at least some of the gas diffused between the annular structure and the rubber layer is diffused (absorbed) into one or both of the rubber layer and the fiber. As a result, the generation of the gas space between the annular structure and the rubber layer is suppressed. Thus, an occurrence of poor bonding between the annular structure and the rubber layer is suppressed, and a deterioration in the performance of the tire is inhibited.

A plurality of the fibers may be disposed between the annular structure and the rubber layer.

At least a part of the carcass portion may be disposed so as to face the inner surface of the annular structure, and the fiber may be disposed between the annular structure and the carcass portion so as to suppress generation of a gas space between the annular structure and the carcass portion.

A pneumatic tire according to the present technology is provided with: a cylindrical annular structure that is disposed around a rotational axis and that has an outer surface and an inner surface; a carcass portion at least a part of which is disposed on an inner surface of the annular structure, the carcass portion having a cord covered by rubber; a rubber layer at least a part of which is disposed so as to face the outer surface of the annular structure, the rubber layer including a tread portion; and a fiber disposed between the annular structure and the carcass portion so as to suppress generation of a gas space between the annular structure and the carcass portion.

According to the present technology, when the carcass portion is disposed so as to face the inner surface of the annular structure, as a result of the fiber being disposed between the annular structure and the carcass portion, the generation of the gas space between the annular structure and the carcass portion is suppressed. Due to the fiber, the gas between the annular structure and the carcass portion is diffused between the annular structure and the carcass portion. For example, due to the fiber, the gas between the annular structure and the carcass portion spreads evenly between the annular structure and the carcass portion, and this inhibits the gas from stagnating in one section. Further, at least some of the gas diffused between the annular structure and the carcass portion is diffused (absorbed) into one or both of the carcass portion and the fiber. As a result, the generation of the gas space between the annular structure and the carcass portion is suppressed. Thus, an occurrence of the poor bonding between the annular structure and the carcass portion is suppressed, and the deterioration in the performance of the tire is inhibited.

A plurality of the fibers may be disposed between the annular structure and the carcass portion.

At least one of the fibers may be disposed in a 100 mm square region on a surface of the annular structure, and five or more of the fibers need not necessarily be disposed in a 10 mm square region on the surface of the annular structure.

A linear density of the fiber may be not less than $1\times10^{-6}$ g/mm and not greater than $1\times10^{-4}$ g/mm, and a diameter of the fiber may be not less than 0.03 mm and not greater than 1.00 mm.

The annular structure may have a plurality of through-holes that penetrate the outer surface and the inner surface.

The fiber may be disposed so as to surround the rotational axis.

The fiber may be disposed so as to be in parallel with the rotational axis.

The fiber may have a dimension less than a dimension of the annular structure in the direction parallel to the rotational axis and a dimension of the annular structure in a direction around the rotational axis, and the fiber may be disposed in a plurality at an equal density in both the direction parallel to the rotational axis and the direction around the rotational axis.

A method of manufacturing a pneumatic tire includes the steps of: producing a cylindrical annular structure that is disposed around a rotational axis and that has an outer surface and an inner surface; disposing, on an outer side of the annular structure in a direction parallel to the rotational axis, at least a part of a carcass portion having a cord covered by rubber; disposing a fiber between at least a part of a rubber layer including a tread portion and the outer surface of the annular structure to cause the at least a part of the rubber layer and the outer surface of the annular structure to face each other; and vulcanizing the rubber layer in a state in which the fiber is disposed between the annular structure and the rubber layer, and joining the rubber layer and the annular structure while suppressing generation of a gas space between the annular structure and the rubber layer.

According to the present technology, when the rubber layer is disposed so as to face the outer surface of the annular structure, as a result of the fiber being disposed between the annular structure and the rubber layer, the generation of the gas space between the annular structure and the rubber layer is suppressed. Due to the fiber, the gas between the annular structure and the rubber layer is diffused between the annular structure and the rubber layer. For example, due to the fiber, the gas between the annular structure and the rubber layer spreads evenly between the annular structure and the rubber layer, and this inhibits the gas from stagnating in one section. Further, at least some of the gas diffused between the annular structure and the rubber layer is diffused (absorbed) into one or both of the rubber layer and the fiber. As a result, the generation of the gas space between the annular structure and the rubber layer is suppressed. Thus, an occurrence of the poor bonding between the annular structure and the rubber layer is suppressed, and a deterioration in the performance of the tire is inhibited.

A method of manufacturing a pneumatic tire includes the steps of: producing a cylindrical annular structure that is disposed around a rotational axis and that has an outer surface and an inner surface; disposing at least a part of a rubber layer so as to face the outer surface of the annular structure, the rubber layer including a tread portion; disposing a fiber between at least a part of a carcass portion and the inner surface of the annular structure to cause the at least a part of the carcass portion and the inner surface of the annular structure to face each other, the carcass portion having a cord covered by rubber; and vulcanizing the carcass portion in a state in which the fiber is disposed between the annular structure and the carcass portion, and joining the carcass portion and the annular structure while suppressing generation of a gas space between the annular structure and the carcass portion.

According to the present technology, when the carcass portion is disposed so as to face the inner surface of the annular structure, as a result of the fiber being disposed between the annular structure and the carcass portion, the generation of the gas space between the annular structure and the carcass portion is suppressed. Due to the fiber, the gas between the annular structure and the carcass portion is diffused between the annular structure and the carcass portion. For example, due to the fiber, the gas between the annular structure and the carcass portion spreads evenly between the annular structure and the carcass portion, and this inhibits the gas from stagnating in one section. Further, at least some of the gas diffused between the annular structure and the carcass portion is diffused (absorbed) into one or both of the carcass portion and the fiber. As a result, the generation of the gas space between the annular structure and the carcass portion is suppressed. Thus, an occurrence of poor bonding between the annular structure and the carcass portion is suppressed, and a deterioration in the performance of the tire is inhibited.

According to the present technology, it is possible to suppress a performance deterioration of a pneumatic tire.

DETAILED DESCRIPTION

Embodiments according to the present technology will be described with reference to the appended drawings. However, the present technology is not limited to those embodiments. The constituents of the embodiments described below can be combined with one another as appropriate. In addition, some of the constituents may not be used in some cases. Furthermore, the constituents of the embodiments described below include constituents that could be easily conceived by a person skilled in the art and constituents that are substantially identical or, in other words, are equivalent in scope.

In the description below, an X-Y-Z Cartesian coordinates system will be set, and a positional relationship of each portion will be described with reference to the X-Y-Z Cartesian coordinates system. One of directions in a horizontal plane is defined as an X-axis direction, a direction orthogonal to the X-axis direction in the horizontal plane is defined as a Y-axis direction, and a direction orthogonal to each of the X-axis direction and the Y-axis direction is defined as a Z-axis direction. Further, rotational (inclination) directions around the X-axis, Y axis, and the Z axis are defined as directions θX, θY, and θZ, respectively. In the present embodiment, a rotational axis (a central axis) of a tire 1 is parallel to the Y-axis. The Y-axis direction is a vehicle width direction or a width direction of the tire 1. A rotational direction (equivalent to the θY direction) of the tire 1 (the tire rotational axis) may also be called a circumferential direction. The X-axis direction and the Z-axis direction are radiation directions with respect to the rotational axis (central axis). The radiation direction with respect to the rotational axis (the central axis) may also be called a radial direction. The ground on which the tire 1 rolls (drives) is roughly parallel to an XY plane.

First Embodiment

Figure 1:
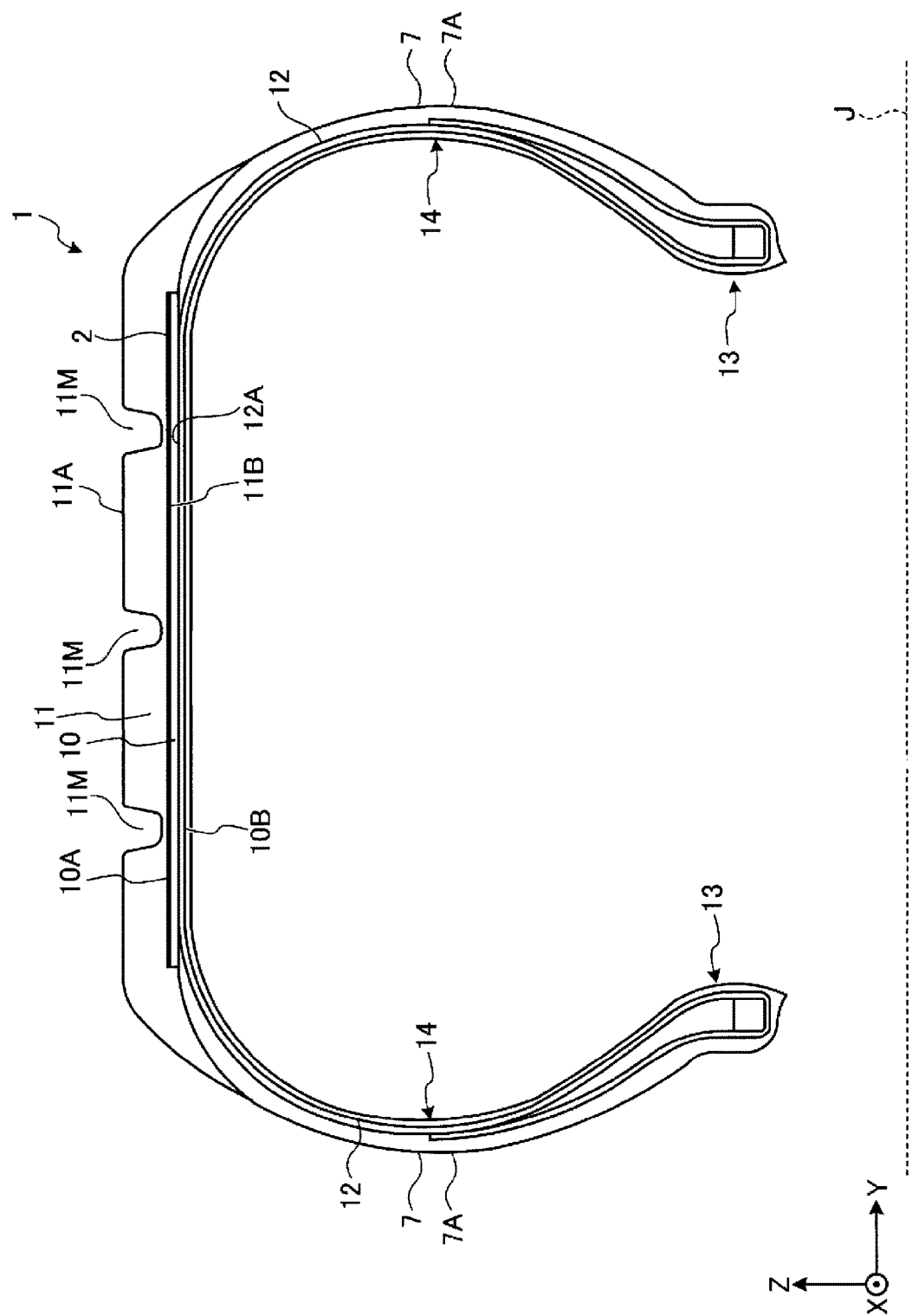
FIG. 1 is a cross-sectional view illustrating a part of a tire according to a first embodiment.

A first embodiment will be described. FIG. 1 is a diagram illustrating one example of the tire 1 according to the present embodiment. FIG. 1 illustrates a meridian cross-section passing through a rotational axis J of the tire 1. The rotational axis J is parallel to the Y-axis. The tire 1 has an annular shape. The rotational axis J is a central axis of the tire 1. When the tire 1 is in use, an interior of the tire 1 is filled with gas. In the present embodiment, the gas filling the tire 1 is air. Specifically, the tire 1 is a pneumatic tire.

In FIG. 1, the tire 1 is provided with a cylindrical annular structure 10 disposed around the rotational axis (central axis) J, a carcass portion 12 that is at least partially disposed on an outer side of the annular structure 10 in the Y-axis direction, a tread rubber layer 11 that is at least partially disposed on the outer side of the annular structure 10 with respect to the rotational axis J, a sidewall rubber layer 7 protecting the carcass portion 12, and a fiber 2 disposed between the annular structure 10 and the tread rubber layer 11 so as to inhibit a gas space from being generated between the annular structure 10 and the tread rubber layer 11.

The annular structure 10 is a cylindrical member. The annular structure 10 is a member (a reinforcing member) that retains a form of the tire 1. The annular structure 10 has an outer surface 10A and an inner surface 10B. The outer surface 10A faces outward in the radiation direction with respect to the rotational axis J. The inner surface 10B faces the direction opposite to the outer surface 10A. The outer surface 10A and the inner surface 10B are each parallel to the Y-axis (the rotational axis J).

The annular structure 10 is made of metal. The annular structure 10 is manufactured using a metal material. The annular structure 10 may include at least one of spring steel, high-tensile steel, stainless steel, and titanium. The titanium may include a titanium alloy. A tensile strength of the metal material of the annular structure 10 may be 450 N/m$^2$ or more and 2500 N/m$^2$ or less, 600 N/m$^2$ or more and 2400 N/m$^2$ or less, or 800 N/m$^2$ or more and 2300 N/m$^2$ or less. In the present embodiment, the annular structure 10 includes stainless steel. Stainless steel has a high corrosion resistance. With stainless steel, the above-described values of the tensile strength can be obtained.

A pressure resistance parameter of the annular structure 10, which is prescribed by the product of the tensile strength (MPa) of the annular structure 10 and the thickness (mm) of the annular structure 10, may be 200 or more and 1700 or less, or may be 250 or more and 1600 or less. The pressure resistance parameter is a parameter by which a resistance to an internal pressure of the gas filling the tire 1 is measured. The pressure resistance parameter of the annular structure 10 of the tire 1 used for a passenger vehicle may be 200 or more and 1000 or less, or may be 250 or more and 950 or less. The pressure resistance parameter of the annular structure 10 of the tire 1 used for a truck or a bus (a TB tire) may be 500 or more and 1700 or less, or may be 600 or more and 1600 or less.

When manufacturing the annular structure 10 from the stainless steel, at least one of JIS (Japanese Industrial Standards) G4303-classified martensitic stainless steel, ferritic stainless steel, austenitic stainless steel, austenitic-ferritic two-phase stainless steel, and precipitation hardening stainless steel may be used. By using such stainless steel, it is possible to manufacture the annular structure 10 having a high tensile strength and toughness.

The carcass portion 12 is a member (a reinforcing member) that forms a framework of the tire 1. The carcass portion 12 includes a cord (a reinforcing material). The cord of the carcass portion 12 may be called a carcass cord. The carcass portion 12 is a cord layer (a reinforcing material layer) including the cord. The carcass portion 12 functions as a pressure vessel when the tire 1 is filled with gas (air).

Figure 2:
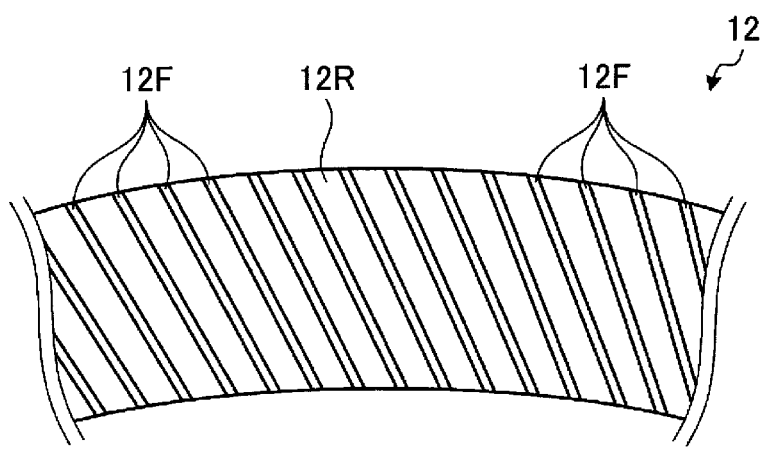
FIG. 2 is a diagram illustrating one example of a carcass portion according to the first embodiment.

FIG. 2 is an enlarged view of a part of the carcass portion 12. As illustrated in FIG. 2, the carcass portion 12 has a rubber 12R and cords 12F covered by the rubber 12R. The cord 12F includes an organic fiber. The rubber 12R that covers the cords 12F may be called a coating rubber or a topping rubber. Note that the carcass portion 12 may include polyester cords 12F, polyamide cords 12F that include an aliphatic backbone, polyamide cords 12F that include only an aromatic backbone, or rayon cords 12F.

As illustrated in FIG. 1, at least a part of the carcass portion 12 is disposed on the outer side of the annular structure 10 in the Y-axis direction. In the present embodiment, at least a part of the carcass portion 12 is disposed on the inner surface 10B side of the annular structure 10. At least a part of the carcass portion 12 is disposed on an inner side of the annular structure 10 in relation to the radiation direction with respect to the rotational axis J. At least a part of the carcass portion 12 is disposed so as to face the inner surface 10B of the annular structure 10. The carcass portion 12 has an outer surface 12A that faces the inner surface 10B of the annular structure 10. The inner surface 10B of the annular structure 10 comes into contact with at least a part of the outer surface 12A of the carcass portion 12. The annular structure 10 and the carcass portion 12 are joined together.

The carcass portion 12 is supported by bead cores 13. The bead cores 13 are each disposed on one side and the other side of the carcass portion 12 in the Y-axis direction. The carcass portion 12 is folded back at the bead cores 13. The bead core 13 is a member (a reinforcing member) that fixes the one end and the other end of the carcass portion 12 in the Y-axis direction. The bead core 13 fixes the tire 1 to a rim of a wheel. The bead core 13 is a bundle of steel wires. Note that the bead core 13 may be a bundle of carbon steel. In the present embodiment, an inner liner 14 is provided on an inner side of the carcass portion 12. The inner liner 14 inhibits the gas filling the interior of the tire 1 from leaking.

The tread rubber layer 11 protects the carcass portion 12. The tread rubber layer 11 is a cylindrical member. At least a part of the tread rubber layer 11 is disposed around the carcass portion 12. The tread rubber layer 11 has an outer surface 11A and an inner surface 11B. The outer surface 11A faces outward in relation to the radiation direction with respect to the rotational axis J. The inner surface 11B faces the direction opposite to the outer surface 11A. The outer surface 11A and the inner surface 11B are each parallel to the Y-axis (the rotational axis J).

The outer surface 11A is a tread surface (a tread portion) that comes into contact with the ground. The tread rubber layer 11 has the outer surface (the tread surface) 11A that comes into contact with the ground and groove portions 11M that are formed in at least a part of the outer surface 11A. At a time of rain, etc., when the tire 1 rolls over wet ground, the groove portions 11M can remove water from between the tire 1 and the ground.

The tread rubber layer 11 includes natural rubber, synthetic rubber, carbon black, sulfur, zinc oxide, a crack preventive material, a vulcanization accelerator, and an anti-aging agent.

At least a part of the tread rubber layer 11 is disposed on the outer surface 10A side of the annular structure 10. At least a part of the tread rubber layer 11 is disposed on the outer side of the annular structure 10 in relation to the radiation direction with respect to the rotational axis J. At least a part of the tread rubber layer 11 is disposed so as to face the outer surface 10A of the annular structure 10. At least a part of the inner surface 11B of the tread rubber layer 11 faces the outer surface 10A of the annular structure 10. The outer surface 10A of the annular structure 10 comes into contact with at least a part of the inner surface 11B of the tread rubber layer 11. The annular structure 10 and the tread rubber layer 11 are joined together.

In the present embodiment, the rotational axis J, the outer surface 10A of the annular structure 10, the inner surface 10B of the annular structure 10, the outer surface 11A of the tread rubber layer 11, and the inner surface 11B of the tread rubber layer 11 are substantially parallel to one another.

The sidewall rubber layers 7 protect the carcass portion 12. The sidewall rubber layers 7 are each disposed on one side and the other side of the tread rubber layer 11 in the Y-axis direction. The sidewall rubber layer 7 has a sidewall portion 7A.

The fiber 2 inhibits the gas space from being generated between the annular structure 10 and the tread rubber layer 11. The fiber 2 is disposed on the outer surface 10A side of the annular structure 10. The fiber 2 is disposed between the annular structure 10 and the tread rubber layer 11. A plurality of the fiber 2 are disposed between the annular structure 10 and the tread rubber layer 11. The plurality of fibers 2 form one layer. The plurality of fibers 2 may collectively be called a fiber layer.

The fiber 2 includes one or both of a natural fiber and a chemical fiber. The natural fiber includes at least one of a plant fiber, an animal fiber, and a mineral fiber. The plant fiber includes at least one of cotton, hemp, and linen. The animal fiber includes at least one of wool, silk, and cashmere. The mineral fiber includes asbestos. The chemical fiber includes at least one of a regenerated fiber manufactured using the natural fiber (a natural polymer) as a raw material, a semi-synthetic fiber manufactured by reforming the natural polymer, a synthetic fiber manufactured from an organic polymeric compound in a purely synthetic manner, and an inorganic fiber made from an inorganic compound. The regenerated fiber includes a cellulosic regenerated fiber. The semi-synthetic fiber includes at least one of a cellulosic semi-synthetic fiber and a protein-based synthetic fiber. The synthetic fiber includes at least one of a polyester-based synthetic fiber and a polyamide-based synthetic fiber. The inorganic fiber includes at least one of a glass fiber and a carbon fiber. The fiber 2 may be a thread-like member (a so-called multifilament) formed by arranging and twisting at least one of the natural fiber and the chemical fiber, or one string of a fiber (a so-called monofilament). The fibers 2 disposed between the annular structure 10 and the tread rubber layer 11 may be fibers of the same type, or may include a plurality of different types of fibers. In the present embodiment, the fiber 2 includes cotton (cotton).

In the present embodiment, a linear density of the fiber 2 is not less than $1 \times 10^{-6}$ g/mm and not more than $1 \times 10^{-4}$ g/mm. A diameter of the fiber 2 is not less than 0.03 mm and not more than 1.00 mm.

Figure 3:
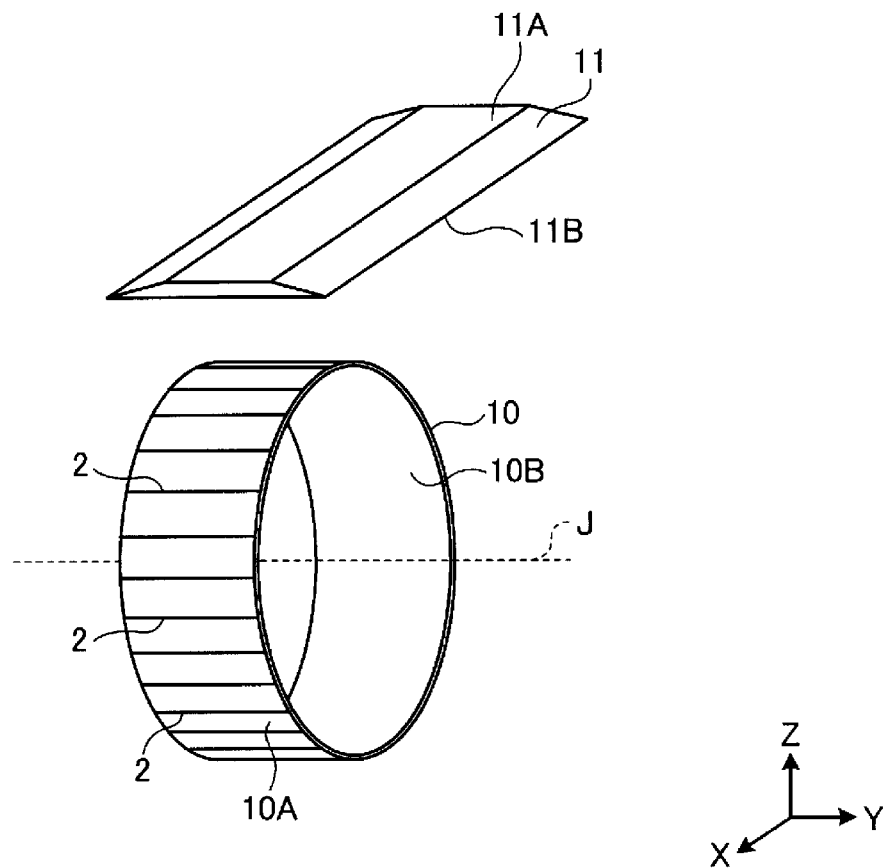
FIG. 3 is an exploded perspective view schematically illustrating one example of the tire according to the first embodiment.

FIG. 3 is an exploded perspective view schematically illustrating one example of the tire 1 according to the present embodiment. As illustrated in FIG. 3, the annular structure 10 is a cylindrical member disposed around the rotational axis (central axis) J. The annular structure 10 has the inner surface 10B disposed so as to face the rotational axis J and the outer surface 10A facing the direction opposite to the inner surface 10B. The tread rubber layer 11 is an annular member disposed around the annular structure 10. Note that a part of the tread rubber layer 11 is schematically illustrated in FIG. 3. Further, an illustration of the carcass portion 12 is omitted in FIG. 3.

The plurality of fibers 2 are disposed between the annular structure 10 and the tread rubber layer 11. In the present embodiment, the fibers 2 are disposed on the outer surface 10A of the annular structure 10. In the present embodiment, each of the plurality of fibers 2 is disposed in parallel with the rotational axis J (the Y-axis). A dimension of the annular structure 10 is identical to a dimension of the fiber 2 in the Y-axis direction.

The plurality of fibers 2 are disposed so as to be separated from each other. Specifically, the plurality of fibers 2 are disposed with an interval between each other. The plurality of fibers 2 are disposed with an interval between each other in the circumferential direction (the direction θY) of the outer surface 10A of the annular structure 10. In the present embodiment, the plurality of fibers 2 are disposed with an equal interval between each other in the circumferential direction (the direction θY) of the outer surface 10A.

In the present embodiment, a distance (the interval) between the adjacent fibers 2 is 5 mm or more and 80 mm or less. The distance (the interval) between the adjacent fibers 2 may be set to be 10 mm or more and 50 mm or less.

In the present embodiment, at least one of the fibers 2 is disposed in a 100 mm square region on the outer surface 10A of the annular structure 10. Five or more of the fibers 2 are not disposed in a 10 mm square region on the outer surface 10A of the annular structure 10.

Figure 4:
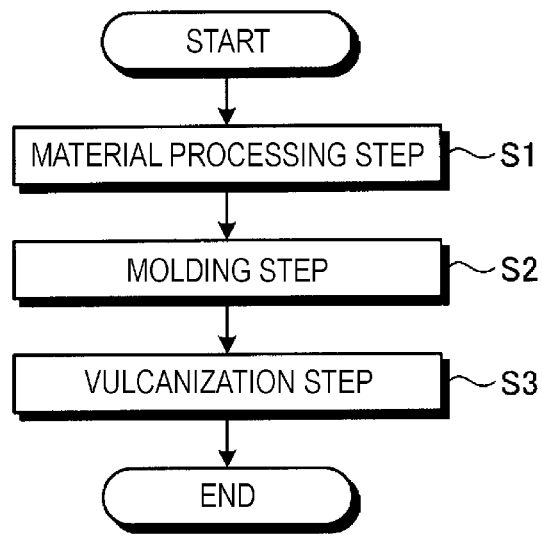
FIG. 4 is a flow chart depicting one example of a manufacturing method of the tire according to the first embodiment.

Next, one example of a manufacturing method of the tire 1 according to the present embodiment will be described. FIG. 4 is a flow chart depicting one example of the manufacturing method of the tire 1 according to the present embodiment. As depicted in FIG. 4, the manufacturing method of the tire 1 includes a material processing step (step S1) in which a material is processed and constituent members of the tire 1 are produced, a molding step (step S2) in which the constituent members of the tire 1 are assembled and the tire 1 (a green tire) is molded, and a vulcanization step (step S3) in which heat and a pressure are applied to the tire 1 (the green tire).

The material processing step (step S1) will be described. In the present embodiment, at least the annular structure 10, the carcass portion 12, the tread rubber layer 11, and the fiber 2 are produced as the constituent members of the tire 1 in the material processing step. For example, as disclosed in Patent Document 2, the cylindrical annular structure 10 having the outer surface 10A and the inner surface 10B are produced as a result of going through a step of causing one end and the other end of a metal plate member to butt against each other and welding and joining the one end and the other end, and a step of removing protrusions generated by the welding. Note that a roughening treatment may be carried out on at least one of the outer surface 10A and the inner surface 10B. Further, the carcass portion 12 having the cords 12F covered by the rubber 12R is produced as a result of going through a step of weaving the cords (the carcass cords) into a band-like shape, a step of causing the cords woven into the band-like shape to be soaked in a chemical, and a step of covering the cords with the rubber. Furthermore, the tread rubber layer 11 is produced as a result of going through a step of mixing raw materials, such as natural rubber, synthetic rubber, carbon black, and sulfur, and a step of extruding the generated rubber. In addition, the plurality of fibers 2 are produced (prepared).

Next, the molding step (step S2) will be described. The constituent members of the tire 1, such the annular structure 10, the carcass portion 12, the tread rubber layer 11, and the fibers 2 are molded by a molding machine, and an original form of the tire 1 is assembled. The original form of the tire 1 includes an unvulcanized raw tire (the green tire). In the present embodiment, a step of disposing at least a part of the carcass portion 12 on the outer side of the annular structure 10 in the Y-axis direction, and a step of disposing the fibers 2 between at least a part of the tread rubber layer 11 and the outer surface 10A of the annular structure 10 and of causing at least the part of the tread rubber layer 11 and the outer surface 10A of the annular structure 10 to face each other are performed. In the present embodiment, at least a part of the carcass portion 12 is disposed so as to face the inner surface 10B of the annular structure 10.

In the present embodiment, an adhesive is provided on the outer surface 10A of the annular structure 10. By providing the adhesive on the outer surface 10A, an adhesive layer is formed on the outer surface 10A. In the present embodiment, after the adhesive is provided on the outer surface 10A, the fibers 2 are disposed so as to face the outer surface 10A of the annular structure 10. The fibers 2 are disposed on the outer surface 10A on which the adhesive is provided. As described above with reference to FIG. 3, etc., in the present embodiment, the plurality of fibers 2 are disposed on the outer surface 10A so as to be in parallel with the Y-axis. The plurality of fibers 2 are disposed on the outer surface 10A in the circumferential direction with an interval between each other. As the adhesive is provided on the outer surface 10A, positions of the fibers 2 are fixed on the outer surface 10A. Note that the adhesive layer may be provided on a primer layer after the primer layer is provided on the outer surface 10A.

After the fibers 2 are disposed on the outer surface 10A on which the adhesive layer is provided, at least a part of the tread rubber layer 11 is disposed so as to face the outer surface 10A of the annular structure 10. The outer surface 10A of the annular structure 10 and the inner surface 11B of the tread rubber layer 11 are joined together with the adhesive layer placed between the outer surface 10A and the inner surface 11B. The tread rubber layer 11 and the annular structure 10 are joined together in a state in which the plurality of fibers 2 are disposed between the inner surface 11B of the tread rubber layer 11 and the outer surface 10A of the annular structure 10.

Further, at least a part of the carcass portion 12 is disposed so as to face the inner surface 10B of the annular structure 10. The inner surface 10B of the annular structure 10 and the outer surface 12A of the carcass portion 12 are joined together with the adhesive layer placed between the inner surface 10B and the outer surface 12A. Further, the carcass portion 12 and the sidewall rubber layer 7 are joined together.

Note that, after the annular structure 10 and the carcass portion 12 are joined together, in a state in which the fibers 2 are disposed between the annular structure 10 and the tread rubber layer 11, the annular structure 10 and the tread rubber layer 11 may be joined together. Note that, in a state in which the fibers 2 are disposed between the annular structure 10 and the tread rubber layer 11, the annular structure 10 and the carcass portion 12 may be joined together after the annular structure 10 and the tread rubber layer 11 are joined together. Note also that the joining between the annular structure 10 and the tread rubber layer 11 and the joining between the annular structure 10 and the carcass portion 12 may be performed simultaneously.

Note that when the annular structure 10 and the tread rubber layer 11 are joined together in a state in which the fibers 2 are disposed between the annular structure 10 and the tread rubber layer 11, the tread rubber layer 11 and the outer surface 10A of the annular structure 10 may be caused to face each other after causing the fibers 2 and the outer surface 10A of the annular structure 10 to face each other, or the fibers 2 and the outer surface 10A of the annular structure 10 may be caused to face each other after causing the tread rubber layer 11 and the outer surface 10A of the annular structure 10 to face each other. Alternatively, the tread rubber layer 11 and the outer surface 10A of the annular structure 10 may be caused to face each other simultaneously with the fibers 2 and the outer surface 10A of the annular structure 10 being caused to face each other.

Next, the vulcanization step (step S3) will be described. After the green tire is produced in step S2, heat and pressure are applied to the green tire. In the present embodiment, the vulcanization step is performed by applying the heat and pressure to the green tire in the state in which the fibers 2 are disposed between the tread rubber layer 11 and the annular structure 10.

In the vulcanization step, the green tire is disposed inside a mold, and the heat and pressure are applied to the green tire by compaction equipment. The heat and pressure cause rubber molecules and sulfur molecules to be bound to each other, and elasticity and durability are thus added to the rubber of the green tire. Further, as a result of the vulcanization step, the tread rubber layer 11 and the annular structure 10 are joined together. Further, as a result of the vulcanization step, the carcass portion 12 and the annular structure 10 are joined together. Further, as a result of the vulcanization step, the tread rubber layer 11 and the sidewall rubber layer 7 are joined together. Further, as a result of the vulcanization step, the sidewall rubber layer 7 and the carcass portion 12 are joined together.

In the present embodiment, the vulcanization step is performed in a state in which the outer surface 10A of the annular structure 10 and the inner surface 11B of the tread rubber layer 11 are in contact with each other. For example, when the inner surface 11B of the tread rubber layer 11 and the outer surface 10A of the annular structure 10 are joined together in the molding step (step S2), there is a possibility that gas (air) enters between the tread rubber layer 11 and the annular structure 10. When the vulcanization step (step S3) is performed in a state in which the gas (air) has entered between the tread rubber layer 11 and the annular structure 10, the gas (air) between the tread rubber layer 11 and the annular structure 10 expands, and thus there is a possibility that a gas space (air entrapment) is generated between the tread rubber layer 11 and the annular structure 10. Further, not only in the vulcanization step (step S3), but also in the molding step (step S2), there is a possibility that the gas space is generated between the tread rubber layer 11 and the annular structure 10. In the present embodiment, the annular structure 10 is made of metal, and the outer surface 10A is a metal face. Thus, when the gas (air) enters between the tread rubber layer 11 and the annular structure 10, there is a higher possibility that it becomes difficult for the entered gas (air) to be discharged from between the tread rubber layer 11 and the annular structure 10.

In the present embodiment, the fibers 2 are disposed between the annular structure 10 and the tread rubber layer 11. As a result of the fibers 2 being disposed, the generation of the gas space (air entrapment) between the annular structure 10 and the tread rubber layer 11 is suppressed.

For example, due to the fibers 2 disposed between the annular structure 10 and the tread rubber layer 11, the gas between the annular structure 10 and the tread rubber layer 11 is diffused between the annular structure 10 and the tread rubber layer 11. For example, due to the fibers 2, the gas between the annular structure 10 and the tread rubber layer 11 spreads evenly between the annular structure 10 and the tread rubber layer 11, and this inhibits the gas from stagnating in one section. Further, there is a possibility that at least some of the gas between the annular structure 10 and the tread rubber layer 11 is guided by the fibers 2 and moves to the outside of the space between the annular structure 10 and the tread rubber layer 11. Further, there is a possibility that at least some of the gas diffused between the annular structure 10 and the tread rubber layer 11 is diffused (absorbed) into one or both of the tread rubber layer 11 and the fibers 2. As a result, the generation of the gas space between the annular structure 10 and the tread rubber layer 11 is suppressed.

In this way, due to the fibers 2, the gas between the annular structure 10 and the tread rubber layer 11 is diffused. As a result of the vulcanization step, including vulcanization of the tread rubber layer 11, being performed in a state in which the fibers 2 are disposed between the annular structure 10 and the tread rubber layer 11, the gas between the annular structure 10 and the tread rubber layer 11 is diffused before the gas space expands. As a result, the annular structure 10 and the tread rubber layer 11 are joined together while suppressing the generation of the gas space between the annular structure 10 and the tread rubber layer 11.

Further, as a result of the fibers 2 being disposed between the annular structure 10 and the tread rubber layer 11, the inner surface 11B of the tread rubber layer 11 is deformed so as to correspond to a shape of the fibers 2. As a result, a surface contact area between the inner surface 11B of the tread rubber layer 11 and the gas becomes larger. As a result of the surface contact area between the tread rubber layer 11 and the gas becoming larger, the diffusion (absorption) of the gas into the tread rubber layer 11 is accelerated. Thus, the generation of the gas space between the annular structure 10 and the tread rubber layer 11 is suppressed.

Further, by using the thread-like member (the so-called multifilament) formed by arranging and twisting a plurality of fibers, as the fiber 2, at least some of the gas between the tread rubber layer 11 and the annular structure 10 is diffused (absorbed) into the fiber 2.

As a result of the vulcanization step being performed in a state in which the fibers 2 are disposed between the annular structure 10 and the tread rubber layer 11, the tire 1 is produced as illustrated in FIG. 1. As illustrated in FIG. 1, in the present embodiment, the annular structure 10 and the fiber 2 are not exposed from an outer surface of the tire 1. The annular structure 10 and the fiber 2 are embedded in the rubber of the tire 1 that includes the tread rubber layer 11 (the rubber of the tread rubber layer 11), the sidewall rubber layer 7 (the rubber of the sidewall rubber layer 7), and the carcass portion 12 (the rubber of the carcass portion 12).

As described above, according to the present embodiment, when the tread rubber layer 11 is disposed so as to face the outer surface 10A of the annular structure 10, as a result of the fibers 2 being disposed between the annular structure 10 and the tread rubber layer 11, the generation of the gas space between the annular structure 10 and the tread rubber layer 11 is suppressed. Thus, an occurrence of poor bonding between the annular structure 10 and the tread rubber layer 11 is suppressed, and a deterioration in the performance of the tire 1 is inhibited.

Further, in the present embodiment, the plurality of fibers 2 are disposed between the annular structure 10 and the tread rubber layer 11. As a result, the generation of the gas space in most of the space between the annular structure 10 and the tread rubber layer 11 is suppressed.

Further, by using the thread-like member (the so-called multifilament) formed by arranging and twisting a plurality of fibers, as the fiber 2, at least some of the gas between the tread rubber layer 11 and the annular structure 10 is diffused (absorbed) into the fiber 2. Further, the surface contact area between the fibers 2 and the gas becomes larger. Thus, even when the gas exists between the annular structure 10 and the tread rubber layer 11, as a result of the fibers 2 absorbing the gas, the generation of the gas space between the annular structure 10 and the tread rubber layer 11 is suppressed.

Further, in the present embodiment, at least one of the fibers 2 is disposed in a 100 mm square region on the outer surface 10A of the annular structure 10, and five or more of the fibers 2 are not disposed in a 10 mm square region on the outer surface 10A of the annular structure 10. When none of the fibers 2 is disposed in a 100 mm square region, there is a higher possibility that the fiber 2 becomes unable to suppress the generation of the gas space. On the other hand, when five or more of the fibers 2 are disposed in a 10 mm square region, there is a possibility that an adhesive strength between the annular structure 10 and the tread rubber layer 11 deteriorates. In the present embodiment, as at least one of the fibers 2 is disposed in a 100 mm square region on the outer surface 10A of the annular structure 10, and five or more of the fibers 2 are not disposed in a 10 mm square region on the outer surface 10A of the annular structure 10, it is possible to suppress the deterioration of the adhesive strength between the annular structure 10 and the tread rubber layer 11 while inhibiting the generation of the gas space. The same applies to embodiments to be described below.

Further, in the present embodiment, the linear density of the fiber 2 is $1 \times 10^{-6}$ g/mm or more and $1 \times 10^{-4}$ g/mm or less, and the diameter of the fiber 2 is 0.03 mm or more and 1.00 mm or less. When the linear density of the fiber 2 is less than $1\times10^{-6}$ g/mm, the gas cannot be diffused sufficiently, and there is a higher possibility that the generation of the gas space cannot be suppressed. When the linear density of the fiber 2 is greater than $1\times10^{-4}$ g/mm, there is a possibility that the adhesive strength between the annular structure 10 and the tread rubber layer 11 deteriorates. Further, when the diameter of the fiber 2 is less than 0.03 mm, the gas cannot be diffused sufficiently, and there is a higher possibility that the generation of the gas space cannot be suppressed. When the diameter of the fiber 2 is greater than 1.00 mm, there is a possibility that the adhesive strength between the annular structure 10 and the tread rubber layer 11 deteriorates. In the present embodiment, as the linear density of the fiber 2 is set to be $1\times10^{-6}$ g/mm or more and $1\times10^{-4}$ g/mm or less, and the diameter of the fiber 2 is set to be 0.03 mm or more and 1.00 mm or less, it is possible to suppress the deterioration of the adhesive strength between the annular structure 10 and the tread rubber layer 11 while inhibiting the generation of the gas space. The same applies to the embodiments to be described below.

Second Embodiment

A second embodiment will be described. In the description below, identical or substantially similar constituent portions to those of the above-described embodiment will be assigned with the same reference numbers, and descriptions of those constituent portions will be either simplified or omitted.

Figure 5:
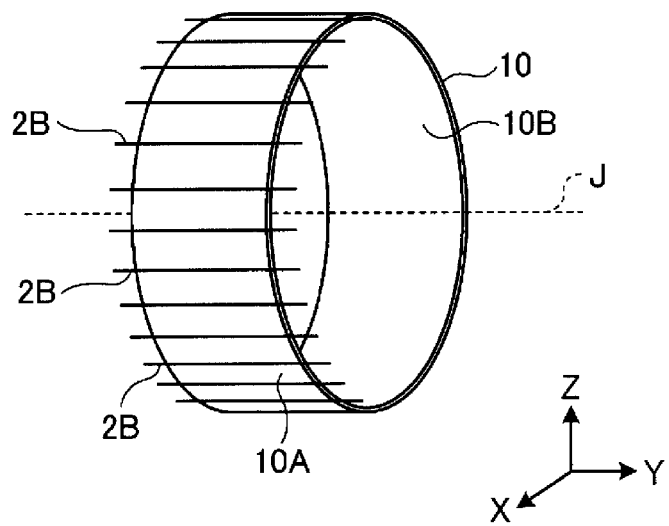
FIG. 5 is a perspective view schematically illustrating a part of the tire according to a second embodiment.

FIG. 5 is a perspective view schematically illustrating one example of the annular structure 10 and fibers 2B according to the present embodiment. An illustration of the tread rubber layer 11 and the carcass portion 12 is omitted in FIG. 5.

As illustrated in FIG. 5, the fibers 2B are disposed on the outer surface 10A of the annular structure 10. A plurality of the fibers 2B are disposed between the annular structure 10 and the tread rubber layer 11. Each of the plurality of fibers 2B is disposed in parallel with the rotational axis J (the Y-axis). A dimension of the fiber 2B is larger than the dimension of the annular structure 10 in the Y-axis direction.

The plurality of fibers 2B are disposed so as to be separated from each other. The plurality of fibers 2B are disposed with an interval between each other in the circumferential direction (the direction θY) of the outer surface 10A of the annular structure 10. In the present embodiment, the plurality of fibers 2B are disposed with an equal interval between each other in the circumferential direction (the direction θY) of the outer surface 10A. A distance (the interval) between the adjacent fibers 2B is set to be 5 mm or more and 80 mm or less. The distance (the interval) between the adjacent fibers 2B may be set to be 10 mm or more and 50 mm or less.

For example, in the molding step (step S2), the fibers 2B are disposed so as to face the outer surface 10A of the annular structure 10, so that the end of the fiber 2B on the +Y side is disposed further to the +Y side than the edge of the annular structure 10 on the +Y side, and the end of the fiber 2B on the −Y side is disposed further to the −Y side than the edge of the annular structure 10 on the −Y side. Specifically, the fibers 2B are disposed on the outer surface 10A of the annular structure 10 so that the end of the fiber 2B on the +Y side protrudes further than the edge of the annular structure 10 on the +Y side, and the end of the fiber 2B on the −Y side protrudes further than the edge of the annular structure 10 on the −Y side.

After the fibers 2B are disposed on the outer surface 10A, at least a part of the tread rubber layer 11 is disposed so as to face the outer surface 10A of the annular structure 10. In a state in which the plurality of fibers 2B are disposed between the inner surface 11B of the tread rubber layer 11 and the outer surface 10A of the annular structure 10, the outer surface 10A of the annular structure 10 and the inner surface 11B of the tread rubber layer 11 are joined together with the adhesive layer placed between the outer surface 10A and the inner surface 11B. The vulcanization step (step S3) is performed in a state in which the outer surface 10A of the annular structure 10 and the inner surface 11B of the tread rubber layer 11 are in contact with each other.

As the fibers 2B are disposed between the annular structure 10 and the tread rubber layer 11, in production steps of the tire 1 including the molding step (step S2) and the vulcanization step (step S3), the generation of the gas space between the annular structure 10 and the tread rubber layer 11 is suppressed.

For example, due to the fibers 2B disposed between the annular structure 10 and the tread rubber layer 11, the gas between the annular structure 10 and the tread rubber layer 11 is diffused between the annular structure 10 and the tread rubber layer 11. Further, in the present embodiment, the ends of the fiber 2B on the +Y side and on the −Y side are disposed on the outside of the edges of the annular structure 10. Specifically, the ends of the fiber 2B on the +Y side and on the −Y side are disposed on the outside of the space between the annular structure 10 and the tread rubber layer 11. As a result, at least some of the gas between the annular structure 10 and the tread rubber layer 11 is guided by the fibers 2B and moves to the outside of the space between the annular structure 10 and the tread rubber layer 11. In other words, at least some of the gas between the annular structure 10 and the tread rubber layer 11 is guided by the fibers 2B so as to escape to the outside of the space between the annular structure 10 and the tread rubber layer 11. As a result, the generation of the gas space between the annular structure 10 and the tread rubber layer 11 is suppressed.

As a result of the vulcanization step being performed in the state in which the fibers 2B are disposed between the annular structure 10 and the tread rubber layer 11, the tire 1 is produced. In the present embodiment, at least one of the ends of the fiber 2B on the +Y side and on the −Y side may protrude (be exposed) from the outer surface of the tire 1. Note that the annular structure 10 and the fibers 2B need not necessarily protrude (be exposed) from the outer surface of the tire 1, but may be embedded in the rubber of the tire 1.

As described above, in the present embodiment also, as a result of the fibers 2B being disposed between the annular structure 10 and the tread rubber layer 11, the generation of the gas space between the annular structure 10 and the tread rubber layer 11 is suppressed. Thus, the occurrence of poor bonding between the annular structure 10 and the tread rubber layer 11 is suppressed, and a deterioration in the performance of the tire 1 is inhibited.

Third Embodiment

Figure 6:
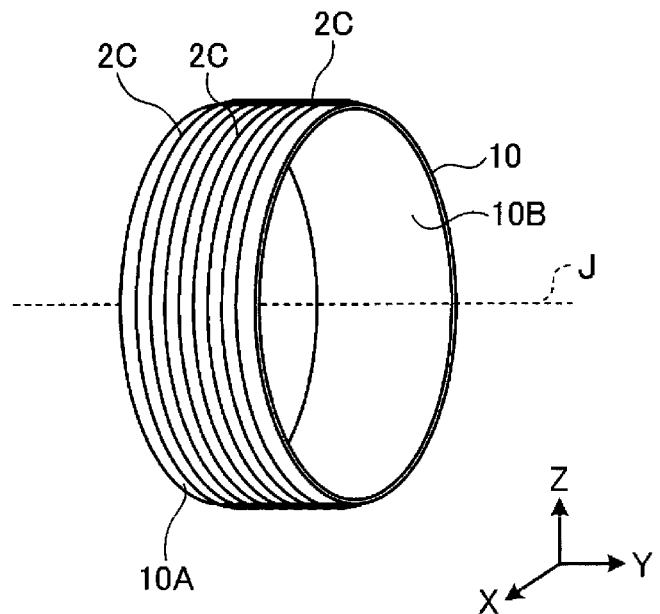
FIG. 6 is a perspective view schematically illustrating a part of the tire according to a third embodiment.

A third embodiment will be described. FIG. 6 is a perspective view schematically illustrating one example of the annular structure 10 and fibers 2C according to the present embodiment. An illustration of the tread rubber layer 11 and the carcass portion 12 is omitted in FIG. 6.

As illustrated in FIG. 6, the fibers 2C are disposed on the outer surface 10A of the annular structure 10. A plurality of the fibers 2C are disposed between the annular structure 10 and the tread rubber layer 11. Each of the plurality of fibers 2C is disposed so as to surround the rotational axis J.

The plurality of fibers 2C are disposed so as to be separated from each other. Specifically, the plurality of fibers 2C are disposed with an interval between each other. The plurality of fibers 2C are disposed on the outer surface 10A of the annular structure 10 with an interval between each other in the Y-axis direction. In the present embodiment, the plurality of fibers 2C are disposed with an equal interval between each other in the Y-axis direction. A distance (the interval) between the adjacent fibers 2C is set to be 5 mm or more and 80 mm or less. The distance (the interval) between the adjacent fibers 2C may be set to be 10 mm or more and 50 mm or less.

In the present embodiment also, as a result of the fibers 2C being disposed between the annular structure 10 and the tread rubber layer 11, the generation of the gas space between the annular structure 10 and the tread rubber layer 11 is suppressed.

Fourth Embodiment

Figure 7:
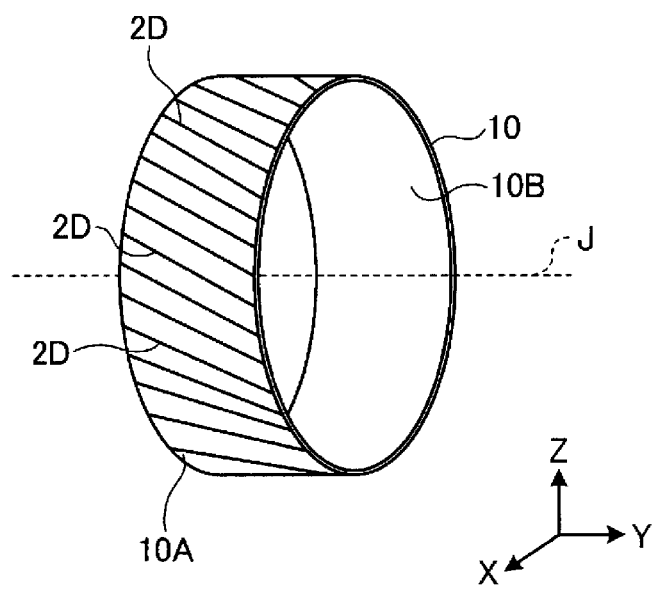
FIG. 7 is a perspective view schematically illustrating a part of the tire according to a fourth embodiment.

A fourth embodiment will be described. FIG. 7 is a perspective view schematically illustrating one example of the annular structure 10 and fibers 2D according to the present embodiment. An illustration of the tread rubber layer 11 and the carcass portion 12 is omitted in FIG. 7.

As illustrated in FIG. 7, the fibers 2D are disposed on the outer surface 10A of the annular structure 10. A plurality of the fibers 2D are disposed between the annular structure 10 and the tread rubber layer 11. Each of the plurality of fibers 2D is disposed so as to be inclined with respect to the rotational axis J (the Y-axis).

The plurality of fibers 2D are disposed so as to be separated from each other. Specifically, the plurality of fibers 2D are disposed with an interval between each other. The plurality of fibers 2D are disposed on the outer surface 10A of the annular structure 10 with an interval between each other in the circumferential direction of the outer surface 10A. In the present embodiment, the plurality of fibers 2D are disposed with an equal interval between each other in the circumferential direction of the outer surface 10A. A distance (the interval) between the adjacent fibers 2D is set to be 5 mm or more and 80 mm or less. The distance (the interval) between the adjacent fibers 2D may be set to be 10 mm or more and 50 mm or less.

In the present embodiment also, as a result of the fibers 2D being disposed between the annular structure 10 and the tread rubber layer 11, the generation of the gas space between the annular structure 10 and the tread rubber layer 11 is suppressed.

Fifth Embodiment

Figure 8:
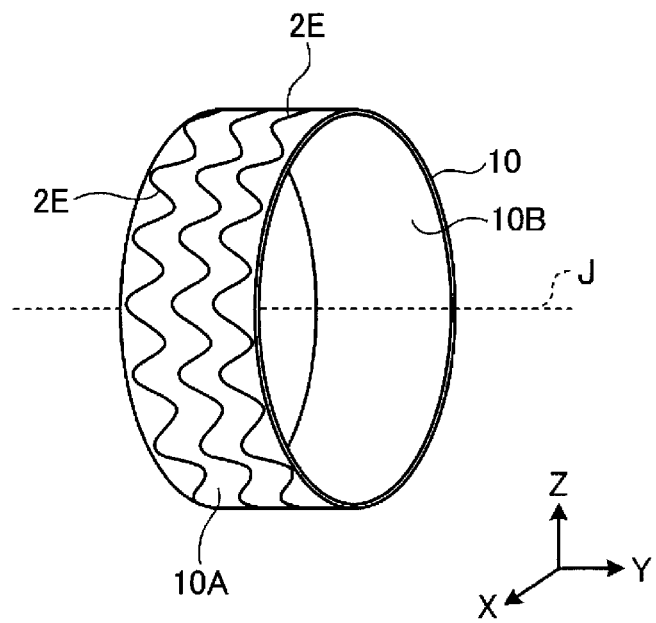
FIG. 8 is a perspective view schematically illustrating a part of the tire according to a fifth embodiment.

A fifth embodiment will be described. FIG. 8 is a perspective view schematically illustrating one example of the annular structure 10 and fibers 2E according to the present embodiment. An illustration of the tread rubber layer 11 and the carcass portion 12 is omitted in FIG. 8.

As illustrated in FIG. 8, the fibers 2E are disposed on the outer surface 10A of the annular structure 10. A plurality of the fibers 2E are disposed between the annular structure 10 and the tread rubber layer 11. Each of the plurality of fibers 2E is disposed so as to surround the rotational axis J. In the present embodiment, each of the plurality of fibers 2E has bent portions. A plurality of the bent portions are provided in the fibers 2E in the circumferential direction. The bent portions include first bent portions that bend so that at least a part of the fiber 2E protrudes toward the +Y side and second bent portions that bend so that at least a part of the fiber 2E protrudes toward the −Y side. The first bent portions and the second bent portions are alternately provided in the circumferential direction.

The plurality of fibers 2E are disposed so as to be separated from each other. Specifically, the plurality of fibers 2E are disposed with an interval between each other. The plurality of fibers 2E are disposed on the outer surface 10A of the annular structure 10 with an interval between each other in the Y-axis direction. In the present embodiment, the plurality of fibers 2E are disposed with an equal interval between each other in the Y-axis direction. A distance (the interval) between the adjacent fibers 2E is set to be 5 mm or more and 80 mm or less. The distance (the interval) between the adjacent fibers 2E may be set to be 10 mm or more and 50 mm or less.

In the present embodiment also, as a result of the fibers 2E being disposed between the annular structure 10 and the tread rubber layer 11, the generation of the gas space between the annular structure 10 and the tread rubber layer 11 is suppressed.

Sixth Embodiment

Figure 9:
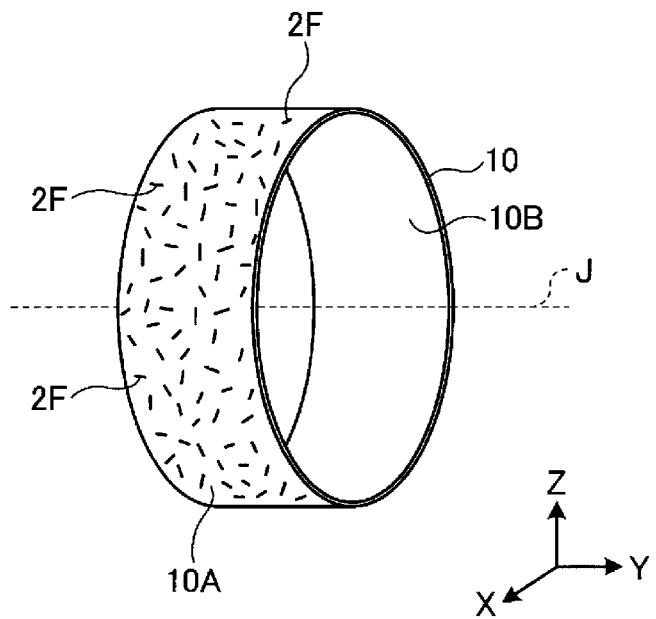
FIG. 9 is a perspective view schematically illustrating a part of the tire according to a sixth embodiment.

A sixth embodiment will be described. FIG. 9 is a perspective view schematically illustrating one example of the annular structure 10 and fibers 2F according to the present embodiment. An illustration of the tread rubber layer 11 and the carcass portion 12 is omitted in FIG. 9.

As illustrated in FIG. 9, the length of the fiber 2F is short. The fiber 2F is a so-called short fiber. The fiber 2F has a dimension less than the dimension of the annular structure 10 in the Y-axis direction and the dimension of the annular structure 10 in the circumferential direction (the direction around the rotational axis J).

The fibers 2F are disposed on the outer surface 10A of the annular structure 10. A plurality of the fibers 2F are disposed between the annular structure 10 and the tread rubber layer 11. The plurality of fibers 2F are disposed so as to be separated from each other. Specifically, the plurality of fibers 2F are disposed with an interval between each other. The plurality of fibers 2F are disposed at a substantially equal density in both the Y-axis direction and the direction around the rotational axis J. In other words, the plurality of fibers 2F are evenly disposed on the outer surface 10A.

For example, in the molding step (step S2), when the adhesive is provided on the outer surface 10A of the annular structure 10 so as to form the adhesive layer, the fibers 2F may be premixed in the adhesive. The adhesive layer including the fibers 2F may be formed on the outer surface 10A as a result of causing the adhesive, in which the fibers 2F are mixed (dispersed), to be provided on the outer surface 10A. Note that when the adhesive layer is provided on the primer layer after the primer layer is provided on the outer surface 10A, the fibers 2F may be premixed in a solution (a primer solution) that is prepared for forming the primer layer, or the fibers 2F may be premixed in both the adhesive and the primer solution.

After the adhesive layer and the fibers 2F are disposed on the outer surface 10A, at least a part of the tread rubber layer 11 is disposed so as to face the outer surface 10A of the annular structure 10. The outer surface 10A of the annular structure 10 and the inner surface 11B of the tread rubber layer 11 are joined together with the adhesive layer placed between the outer surface 10A and the inner surface 11B.

The tread rubber layer 11 and the annular structure 10 are joined together in a state in which the plurality of fibers 2F are disposed between the inner surface 11B of the tread rubber layer 11 and the outer surface 10A of the annular structure 10.

In the present embodiment also, due to the fibers 2F disposed between the annular structure 10 and the tread rubber layer 11, the gas is diffused between the annular structure 10 and the tread rubber layer 11. Thus, the generation of the gas space between the annular structure 10 and the tread rubber layer 11 is suppressed.

Seventh Embodiment

Figure 10:
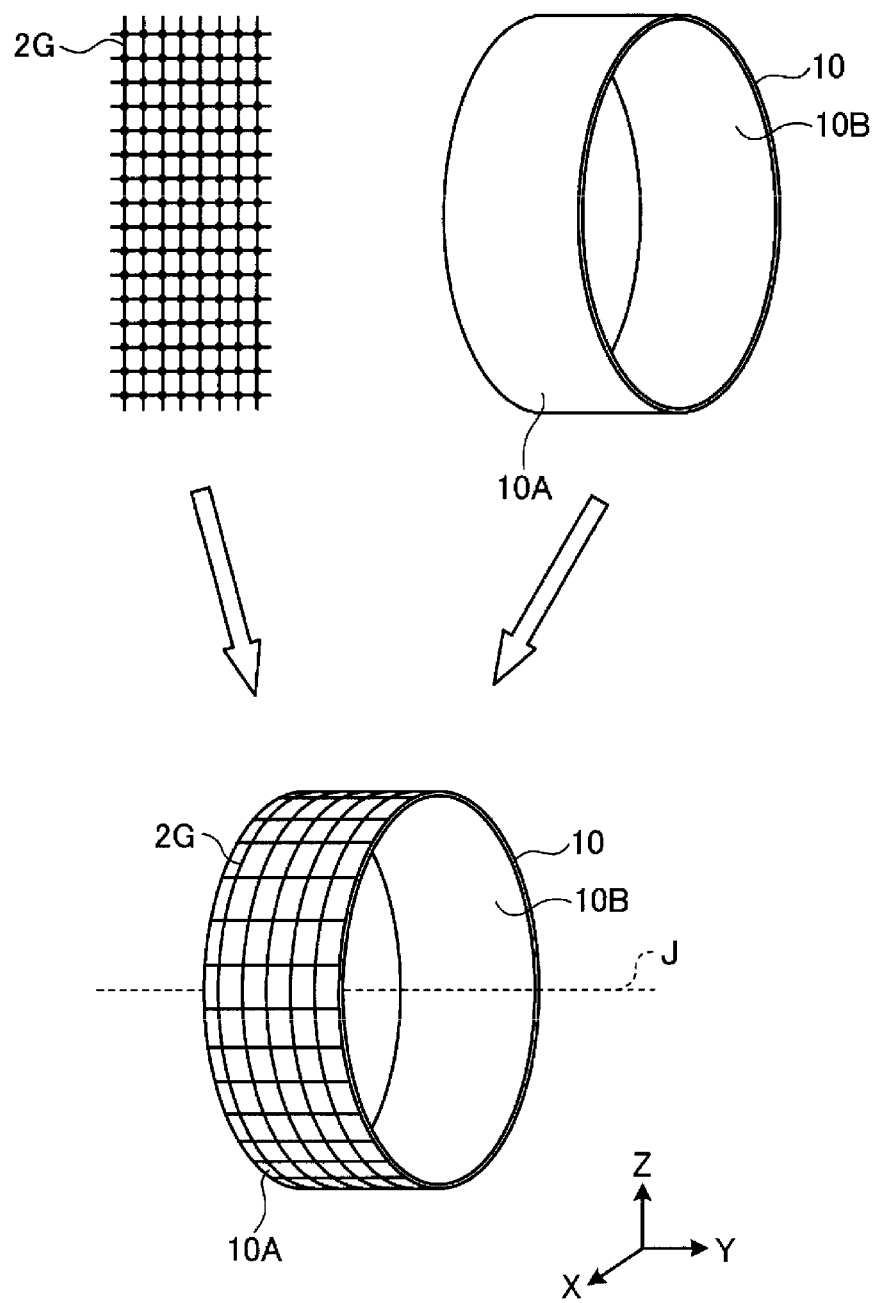
FIG. 10 is a perspective view schematically illustrating a part of the tire according to a seventh embodiment.

A seventh embodiment will be described. FIG. 10 is a perspective view schematically illustrating one example of the annular structure 10 and fibers 2G according to the present embodiment. An illustration of the tread rubber layer 11 and the carcass portion 12 is omitted in FIG. 10.

As illustrated in FIG. 10, the fibers 2G are disposed on the outer surface 10A of the annular structure 10. A plurality of the fibers 2G are disposed between the annular structure 10 and the tread rubber layer 11. Each of the plurality of fibers 2G is disposed so as to surround the rotational axis J. Some of the plurality of fibers 2G are disposed so as to be in parallel with the rotational axis J.

In the present embodiment, the fibers 2G are woven into a mesh-like pattern before being disposed on the outer surface 10A. In the present embodiment, the fibers 2G formed in the mesh-like pattern are disposed on the outer surface 10A of the annular structure 10.

In the present embodiment also, as a result of the fibers 2G being disposed between the annular structure 10 and the tread rubber layer 11, the generation of the gas space between the annular structure 10 and the tread rubber layer 11 is suppressed.

Eighth Embodiment

An eighth embodiment will be described. In the description below, identical or substantially similar constituent portions to those of the above-described embodiments will be assigned with the same reference numbers, and descriptions of those constituent portions will be either simplified or omitted.

Figure 11:
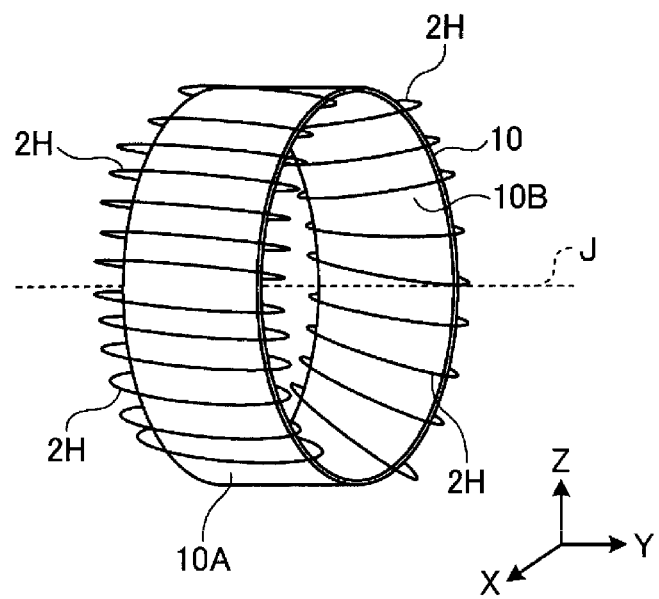
FIG. 11 is a perspective view schematically illustrating a part of the tire according to an eighth embodiment.

FIG. 11 is a perspective view schematically illustrating one example of the annular structure 10 and fibers 2H according to the present embodiment. An illustration of the tread rubber layer 11 and the carcass portion 12 is omitted in FIG. 11.

As illustrated in FIG. 11, at least a part of the fiber 2H is disposed on the outer surface 10A of the annular structure 10. At least a part of the fiber 2H is disposed on the inner surface 10B of the annular structure 10. At least a part of the fiber 2H is disposed between the annular structure 10 and the tread rubber layer 11. At least a part of the fiber 2H is disposed between the annular structure 10 and the carcass portion 12.

In the present embodiment, a plurality of the fibers 2H are disposed on the annular structure 10. The plurality of fibers 2H are disposed between the annular structure 10 and the tread rubber layer 11. The plurality of fibers 2H are disposed between the annular structure 10 and the carcass portion 12. Each of the plurality of fibers 2H has an annular shape. The fiber 2H is disposed so as to be wound around the annular structure 10, while a part of the fiber 2H is disposed on the outer surface 10A and a part of the fiber 2H is disposed on the inner surface 10B. A part of the fiber 2H is disposed on the outer surface 10A so as to be parallel with the rotational axis J (the Y-axis). A part of the fiber 2H is disposed on the inner surface 10B so as to be parallel with the rotational axis J (the Y-axis). The plurality of fibers 2H are disposed on the outer surface 10A with an interval between each other. The plurality of fibers 2H are disposed on the inner surface 10B with an interval between each other. The plurality of fibers 2H are disposed in the direction around the rotational axis J (the circumferential direction) with an equal interval between each other.

Note that the plurality of fiber 2H need not necessarily be disposed on the annular structure 10. For example, the long single fiber 2H may be disposed so as to be spirally wound around the annular structure 10. A part of the spirally wound fiber 2H may be disposed on the outer surface 10A, and a part of the fiber 2H may be disposed on the inner surface 10B.

For example, in the molding step (step S2), the fiber 2H is disposed on the annular structure 10 so that a part of the fiber 2H is disposed on the outer surface 10A and a part of the fiber 2H is disposed on the inner surface 10B. For example, after the adhesive (adhesive layer) is provided on each of the outer surface 10A and the inner surface 10B of the annular structure 10, a part of the fiber 2H is disposed so as to face the outer surface 10A of the annular structure 10, and a part of the fiber 2H is disposed so as to face the inner surface 10B of the annular structure 10. The fiber 2H is disposed on the outer surface 10A and the inner surface 10B on each of which the adhesive is provided.

As the adhesive is provided on each of the outer surface 10A and the inner surface 10B, a position of the fiber 2H is fixed on each of the outer surface 10A and the inner surface 10B. Note that, after the primer layer is provided on one or both of the outer surface 10A and the inner surface 10B, the adhesive layer may be provided on top of the primer layer.

In the present embodiment, a distance (an interval) between the adjacent fibers 2H disposed on the outer surface 10A is set to be 5 mm or more and 80 mm or less. The distance (the interval) between the adjacent fibers 2H disposed on the outer surface 10A may be set to be 10 mm or more and 50 mm or less. In the present embodiment, a distance (an interval) between the adjacent fibers 2H disposed on the inner surface 10B is set to be 5 mm or more and 80 mm or less. The distance (the interval) between the adjacent fibers 2H disposed on the inner surface 10B may be set to be 10 mm or more and 50 mm or less.

In the present embodiment, at least one of the fibers 2H is disposed in a 100 mm square region on the outer surface 10A of the annular structure 10. Five or more of the fibers 2H are not disposed in a 10 mm square region on the outer surface 10A of the annular structure 10. In the present embodiment, at least one of the fibers 2H is disposed in a 100 mm square region on the inner surface 10B of the annular structure 10. Five or more of the fibers 2H are not disposed in a 10 mm square region on the inner surface 10B of the annular structure 10.

After the fiber 2H is disposed on each of the outer surface 10A and the inner surface 10B, at least a part of the tread rubber layer 11 is disposed so as to face the outer surface 10A of the annular structure 10. The outer surface 10A of the annular structure 10 and the inner surface 11B of the tread rubber layer 11 are joined together with the adhesive layer placed between the outer surface 10A and the inner surface 11B. The tread rubber layer 11 and the annular structure 10 are joined together in a state in which the plurality of fibers 2H are disposed between the inner surface 11B of the tread rubber layer 11 and the outer surface 10A of the annular structure 10.

Further, at least a part of the carcass portion 12 is disposed so as to face the inner surface 10B of the annular structure 10. The inner surface 10B of the annular structure 10 and the outer surface 12A of the carcass portion 12 are joined together with the adhesive layer placed between the inner surface 10B and the outer surface 12A. The annular structure 10 and the carcass portion 12 are joined together in a state in which the plurality of fibers 2H are disposed between the inner surface 10B of the annular structure 10 and the outer surface 12A of the carcass portion 12.

In a state in which the fibers 2H are disposed between the tread rubber layer 11 and the annular structure 10 and the fibers 2H are disposed between the annular structure 10 and the carcass portion 12, the vulcanization step (step S3), including the vulcanization of the tread rubber layer 11 and the carcass portion 12, is performed. As a result of the vulcanization step, the tread rubber layer 11 and the annular structure 10 are joined together. Further, as a result of the vulcanization step, the carcass portion 12 and the annular structure 10 are joined together.

The vulcanization step is performed in a state in which the outer surface 10A of the annular structure 10 and the inner surface 11B of the tread rubber layer 11 are in contact with each other. Further, the vulcanization step is performed in a state in which the inner surface 10B of the annular structure 10 and the outer surface 12A of the carcass portion 12 are in contact with each other.

In the present embodiment, the fibers 2H are disposed between the annular structure 10 and the tread rubber layer 11. Thus, the generation of the gas space (air entrapment) between the annular structure 10 and the tread rubber layer 11 is suppressed. Further, in the present embodiment, the fibers 2H are disposed between the annular structure 10 and the carcass portion 12. Thus, the generation of the gas space (air entrapment) between the annular structure 10 and the carcass portion 12 is suppressed.

For example, due to the fibers 2H being disposed between the annular structure 10 and the carcass portion 12, the gas between the annular structure 10 and the carcass portion 12 is diffused between the annular structure 10 and the carcass portion 12. For example, due to the fibers 2H, the gas between the annular structure 10 and the carcass portion 12 spreads evenly between the annular structure 10 and the carcass portion 12, and this inhibits the gas from stagnating in one section. Further, there is a possibility that at least some of the gas between the annular structure 10 and the carcass portion 12 is guided by the fibers 2H and moves to the outside of the space between the annular structure 10 and the carcass portion 12. Further, there is a possibility that at least some of the gas diffused between the annular structure 10 and the carcass portion 12 is diffused (absorbed) into one or both of the carcass portion 12 and the fibers 2H. As a result, the generation of the gas space between the annular structure 10 and the carcass portion 12 is suppressed.

In this way, due to the fibers 2H, the gas between the annular structure 10 and the carcass portion 12 is diffused. As a result of the vulcanization step, including the vulcanization of the carcass portion 12, being performed in a state in which the fibers 2H are disposed between the annular structure 10 and the carcass portion 12, the gas between the annular structure 10 and the carcass portion 12 is diffused before the gas space expands. As a result, the annular structure 10 and the carcass portion 12 are joined together while suppressing the generation of the gas space between the annular structure 10 and the carcass portion 12. Similarly, due to the fibers 2H, the annular structure 10 and the tread rubber layer 11 are joined together while suppressing the generation of the gas space between the annular structure 10 and the tread rubber layer 11.

Further, as a result of the fibers 2H being disposed between the annular structure 10 and the carcass portion 12, the outer surface 12A of the carcass portion 12 is deformed so as to correspond to a shape of the fibers 2H. As a result, the surface contact area between the outer surface 12A of the carcass portion 12 and the gas becomes larger. As a result of the surface contact area between the carcass portion 12 and the gas becoming larger, the diffusion (absorption) of the gas into the carcass portion 12 is accelerated. Thus, the generation of the gas space between the annular structure 10 and the carcass portion 12 is suppressed. Similarly, due to the fibers 2H, the surface contact area between the inner surface 11B of the tread rubber layer 11 and the gas becomes larger. Thus, the generation of the gas space between the annular structure 10 and the tread rubber layer 11 is suppressed.

Further, by using the thread-like member (the so-called multifilament) formed by arranging and twisting a plurality of fibers, as the fibers 2H, at least some of the gas between the tread rubber layer 11 and the annular structure 10 and at least some of the gas between the annular structure 10 and the carcass portion 12 are diffused (absorbed) into the fibers 2H.

As described above, according to the present embodiment, due to the fibers 2H disposed between the annular structure 10 and the tread rubber layer 11, in the production steps of the tire 1 including the molding step (step S2) and the vulcanization step (step S3), the generation of the gas space between the annular structure 10 and the tread rubber layer 11 is suppressed. Further, due to the fibers 2H disposed between the annular structure 10 and the carcass portion 12, in the production steps of the tire 1 including the molding step (step S2) and the vulcanization step (step S3), the generation of the gas space between the annular structure 10 and the carcass portion 12 is suppressed.

Ninth Embodiment

Figure 12:
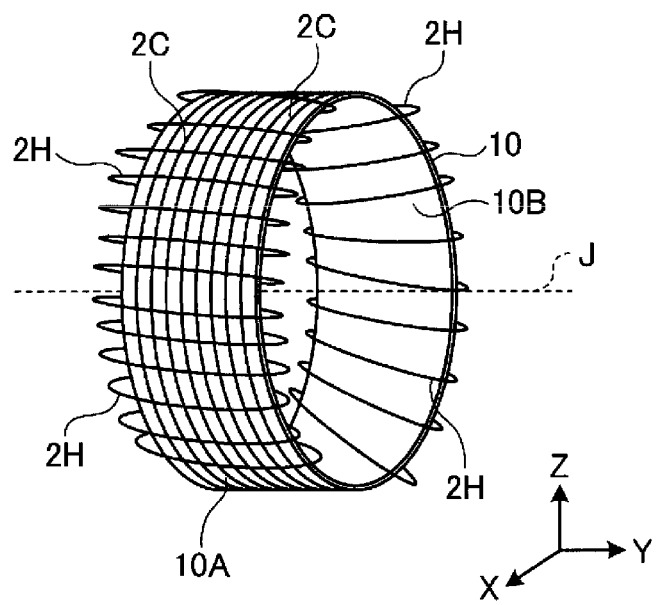
FIG. 12 is a perspective view schematically illustrating a part of the tire according to a ninth embodiment.

A ninth embodiment will be described. FIG. 12 is a perspective view schematically illustrating one example of the annular structure 10 and fibers according to the present embodiment. An illustration of the tread rubber layer 11 and the carcass portion 12 is omitted in FIG. 12.

As illustrated in FIG. 12, for example, both the fibers 2C described with reference to FIG. 6 and the fibers 2H described with reference to FIG. 11 may be disposed on the annular structure 10. Note that the fibers disposed so as to surround the rotational axis J may also be disposed on the inner surface 10B of the annular structure 10.

In the present embodiment also, the generation of the gas space between the annular structure 10 and the tread rubber layer 11, and the generation of the gas space between the annular structure 10 and the carcass portion 12 are suppressed.

Tenth Embodiment

A tenth embodiment will be described. In the embodiment described below, an example will be described in which, after the fibers 2 are disposed on the tread rubber layer 11, the tread rubber 11, on which the fibers 2 are disposed, and the annular structure 10 are joined together. In the description below, identical or substantially similar constituent portions to those of the above-described embodiments will be assigned with the same reference numbers, and descriptions of those constituent portions will be either simplified or omitted.

Figure 13:
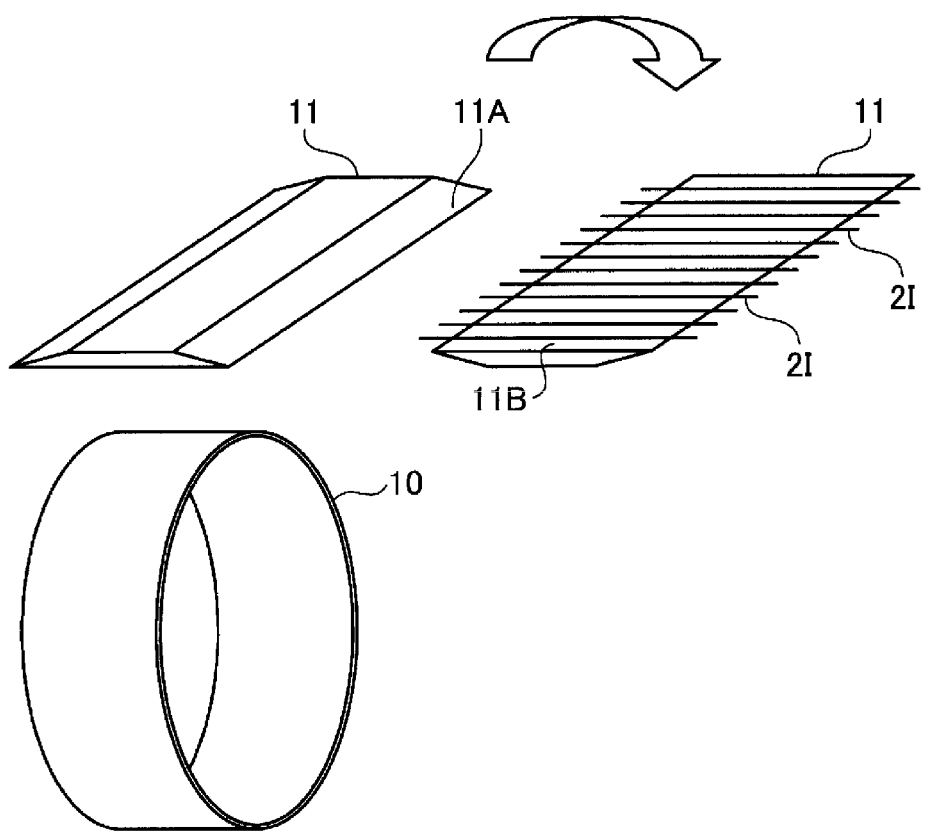
FIG. 13 is an exploded perspective view schematically illustrating one example of the tire according to a tenth embodiment.

FIG. 13 is a perspective view schematically illustrating one example of the annular structure 10, the tread rubber layer 11, and fibers 2I according to the present embodiment. In FIG. 13, an illustration of the carcass portion 12 is omitted.

As illustrated in FIG. 13, the fibers 2I are disposed on the inner surface 11B of the tread rubber layer 11. A plurality of the fibers 2I are disposed between the annular structure 10 and the tread rubber layer 11. Each of the plurality of fibers 2I is disposed in parallel with the rotational axis J (the Y-axis). A dimension of the fiber 2I is larger than a dimension of the tread rubber layer 11 in the Y-axis direction.

The plurality of fibers 2I are disposed so as to be separated from each other. The plurality of fibers 2I are disposed with an interval between each other in the circumferential direction (the direction θY) of the inner surface 11B of the tread rubber layer 11. In the present embodiment, the plurality of fibers 2I are disposed with an equal interval between each other in the circumferential direction (the direction θY) of the inner surface 11B. A distance (an interval) between the adjacent fibers 2I is set to be 5 mm or more and 80 mm or less. The distance (the interval) between the adjacent fibers 2I may be set to be 10 mm or more and 50 mm or less.

For example, in the molding step (step S2), the fibers 2I are disposed so as to face the inner surface 11B of the tread rubber layer 11, so that the end of the fiber 2I on the +Y side is disposed further to the +Y side than the edge of the tread rubber layer 11 on the +Y side, and the end of the fiber 2I on the −Y side is disposed further to the −Y side than the edge of the tread rubber layer 11 on the −Y side. Specifically, the fibers 2I are disposed on the inner surface 11B of the tread rubber layer 11 so that the end of the fiber 2I on the +Y side protrudes further than the edge of the tread rubber layer 11 on the +Y side, and the end of the fiber 2I on the −Y side protrudes further than the edge of the tread rubber layer 11 on the −Y side.

In the present embodiment, the adhesive (adhesive layer) is provided on the inner surface 11B of the tread rubber layer 11. The fibers 2I are disposed on the inner surface 11B of the tread rubber layer 11 on which the adhesive is provided. As a result, the fibers 2I are fixed on the inner surface 11B.

After the fibers 2I are disposed on the inner surface 11B, at least a part of the annular structure 10 is disposed so as to face the inner surface 11B of the tread rubber layer 11. The outer surface 10A of the annular structure 10 and the inner surface 11B of the tread rubber layer 11 are joined together with the adhesive layer placed between the outer surface 10A and the inner surface 11B in a state in which the plurality of fibers 2I are disposed between the inner surface 11B of the tread rubber layer 11 and the outer surface 10A of the annular structure 10. Note that the adhesive need not necessarily be provided on the inner surface 11B of the tread rubber layer 11, and the adhesive may be provided on the outer surface 10A of the annular structure 10. Then, the tread rubber layer 11, on the inner surface 11B of which the fiber 2I is disposed, and the annular structure 10 may be joined together. Even when the adhesive is not provided on the inner surface 11B of the tread rubber layer 11, positions of the fibers 2I are fixed on the inner surface 11B by an adhesive force (an adhesive force or tack of the rubber itself) of the inner surface 11B of the tread rubber layer 11. Note that the adhesive may be provided on both the tread rubber layer 11 and the annular structure 10. The vulcanization step (step S3) is performed in a state in which the outer surface 10A of the annular structure 10 and the inner surface 11B of the tread rubber layer 11 are in contact with each other.

As the fibers 2I are disposed between the annular structure 10 and the tread rubber layer 11, in the production steps of the tire 1 including the molding step (step S2) and the vulcanization step (step S3), the generation of the gas space between the annular structure 10 and the tread rubber layer 11 is suppressed.

For example, due to the fibers 2I disposed between the annular structure 10 and the tread rubber layer 11, the gas between the annular structure 10 and the tread rubber layer 11 is diffused between the annular structure 10 and the tread rubber layer 11. Further, in the present embodiment, ends of the fibers 2I on the +Y side and on the −Y side are disposed on the outside of the edges of the tread rubber layer 11. Specifically, the ends of the fibers 2I on the +Y side and on the −Y side are disposed on the outside of the space between the annular structure 10 and the tread rubber layer 11. As a result, at least some of the gas between the annular structure 10 and the tread rubber layer 11 is guided by the fibers 2I and moves to the outside of the space between the annular structure 10 and the tread rubber layer 11. In other words, at least some of the gas between the annular structure 10 and the tread rubber layer 11 is guided so as to escape to the outside of the space between the annular structure 10 and the tread rubber layer 11. As a result, the generation of the gas space between the annular structure 10 and the tread rubber layer 11 is suppressed.

As a result of the vulcanization step being performed in a state in which the fibers 2I are disposed between the annular structure 10 and the tread rubber layer 11, the tire 1 is produced. In the present embodiment, at least one of the ends of the fiber 2I on the +Y side and on the −Y side may protrude (be exposed) from the outer surface of the tire 1. Note that the annular structure 10 and the fibers 2I need not necessarily protrude (be exposed) from the outer surface of the tire 1, but may be embedded in the rubber of the tire 1.

As described above, in the present embodiment also, as a result of the fibers 2I being disposed between the annular structure 10 and the tread rubber layer 11, the generation of the gas space between the annular structure 10 and the tread rubber layer 11 is suppressed. Thus, the occurrence of the poor bonding between the annular structure 10 and the tread rubber layer 11 is suppressed, and the deterioration in the performance of the tire 1 is inhibited.

Note that, in the present embodiment, the fibers 2I need not necessarily be caused to protrude outward from the edge of the tread rubber layer 11.

Eleventh Embodiment

Figure 14:
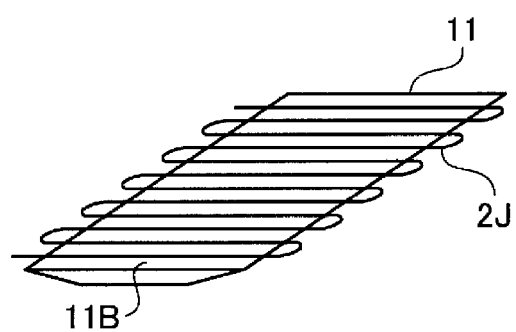
FIG. 14 is a diagram schematically illustrating a part of the tire according to an eleventh embodiment.

An eleventh embodiment will be described. FIG. 14 is a perspective view schematically illustrating one example of the tread rubber layer 11 and a fiber 2J according to the present embodiment.

As illustrated in FIG. 14, the fiber 2J is disposed on the inner surface 11B of the tread rubber layer 11. The fiber 2J is disposed between the annular structure 10 and the tread rubber layer 11. In the present embodiment, the fiber 2J has bent portions. A plurality of the bent portions are provided in the fiber 2J in the circumferential direction of the inner surface 11B. The bent portions include first bent portions that bend so that at least a part of the fiber 2J protrudes toward one side (+Y side) in the width direction of the tread rubber layer 11 (the width direction of the tire 1), and second bent portions that bend so that at least a part of the fiber 2J protrudes toward the other side (−Y side) in the width direction of the tread rubber layer 11 (the width direction of the tire 1). The first bent portions and the second bent portions are alternately provided in the circumferential direction of the inner surface 11B. In the present embodiment, the bent portions of the fiber 2J are disposed on the outside of the edge of the tread rubber layer 11. Note that the fiber 2J need not necessarily be caused to protrude outward from the edge of the tread rubber layer 11.

In the present embodiment also, as a result of the fiber 2J being disposed between the annular structure 10 and the tread rubber layer 11, the generation of the gas space between the annular structure 10 and the tread rubber layer 11 is suppressed.

Twelfth Embodiment

Figure 15:
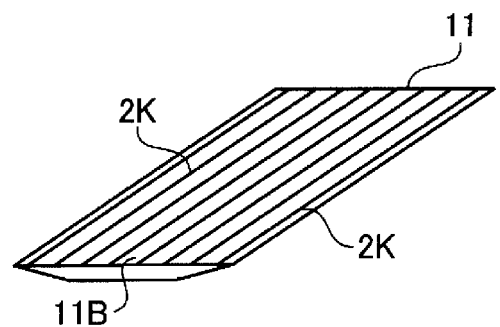
FIG. 15 is a diagram schematically illustrating a part of the tire according to a twelfth embodiment.

A twelfth embodiment will be described. FIG. 15 is a perspective view schematically illustrating one example of the tread rubber layer 11 and fibers 2K according to the present embodiment.

As illustrated in FIG. 15, the fibers 2K are disposed on the inner surface 11B of the tread rubber layer 11. A plurality of the fibers 2K are disposed between the annular structure 10 and the tread rubber layer 11. Each of the plurality of fibers 2K is disposed so as to surround the rotational axis J.

The plurality of fibers 2K are disposed so as to be separated from each other. Specifically, the plurality of fibers 2K are disposed with an interval between each other. The plurality of fibers 2K are disposed, on the inner surface 11B of the tread rubber layer 11, with an interval between each other in the width direction of the tread rubber layer 11 (the width direction of the tire 1). In the present embodiment, the plurality of fibers 2K are disposed with an equal interval between each other in the width direction of the tread rubber layer 11 (the width direction of the tire 1). A distance (an interval) between the adjacent fibers 2K is set to be 5 mm or more and 80 mm or less. The distance (the interval) between the adjacent fibers 2 may be set to be 10 mm or more and 50 mm or less.

In the present embodiment also, as a result of the fiber 2K being disposed between the annular structure 10 and the tread rubber layer 11, the generation of the gas space between the annular structure 10 and the tread rubber layer 11 is suppressed.

Thirteenth Embodiment

Figure 16:
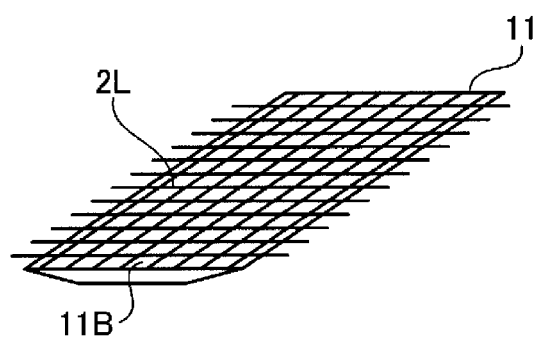
FIG. 16 is a diagram schematically illustrating a part of the tire according to a thirteenth embodiment.

A thirteenth embodiment will be described. FIG. 16 is a perspective view schematically illustrating one example of the tread rubber layer 11 and fibers 2L according to the present embodiment. In FIG. 16, an illustration of the annular structure 10 and the carcass portion 12 is omitted.

As illustrated in FIG. 16, the fibers 2L are disposed on the inner surface 11B of the tread rubber layer 11. A plurality of the fibers 2L are disposed between the annular structure 10 and the tread rubber layer 11. Some of the plurality of fibers 2L are disposed so as to surround the rotational axis J. Some of the plurality of fibers 2L are disposed so as to be in parallel with the rotational axis J.

In the present embodiment, the fibers 2L are woven into a mesh-like pattern. The fibers 2L may be woven into the mesh-like pattern before being disposed on the inner surface 11B. In the present embodiment, the fiber 2L formed in the mesh-like pattern is disposed on the inner surface 11B of the tread rubber layer 11.

In the present embodiment also, as a result of the fibers 2L being disposed between the annular structure 10 and the tread rubber layer 11, the generation of the gas space between the annular structure 10 and the tread rubber layer 11 is suppressed.

Fourteenth Embodiment

Figure 17:
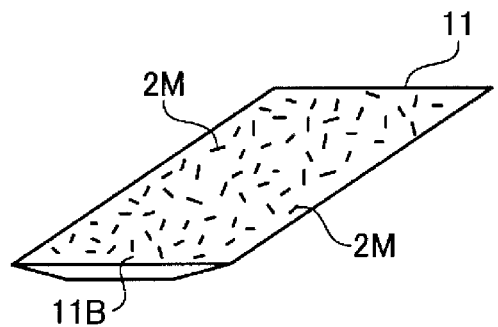
FIG. 17 is a diagram schematically illustrating a part of the tire according to a fourteenth embodiment.

A fourteenth embodiment will be described. FIG. 17 is a perspective view schematically illustrating one example of the tread rubber layer 11 and fibers 2M according to the present embodiment.

As illustrated in FIG. 17, the length of the fiber 2M is short. The fiber 2M is a so-called short fiber. The fiber 2M has a dimension less than the dimension of the annular structure 10 in the direction parallel to the Y-axis direction, and the dimension of the annular structure 10 in the direction around the rotational axis J.

The fibers 2M are disposed on the inner surface 11B of the tread rubber layer 11. A plurality of the fibers 2M are disposed between the annular structure 10 and the tread rubber layer 11. The plurality of fibers 2M are disposed so as to be separated from each other. Specifically, the plurality of fibers 2M are disposed with an interval between each other. The plurality of fibers 2M are disposed at a substantially equal density in both the direction parallel to the rotational axis J and the direction around the rotational axis J. In other words, the plurality of fibers 2M are evenly disposed on the inner surface 11B.

For example, in the molding step (step S2), when the adhesive is provided on the inner surface 11B of the tread rubber layer 11 so as to form the adhesive layer, the fibers 2M may be premixed in the adhesive. The adhesive layer including the fibers 2M may be formed on the inner surface 11B as a result of causing the adhesive, in which the fibers 2M are mixed (dispersed), to be provided on the inner surface 11B. Note that when the adhesive layer is provided on the primer layer after the primer layer is provided on the inner surface 11B, the fibers 2M may be premixed in the solution (the primer solution) that is prepared for forming the primer layer, or the fibers 2M may be premixed in both the adhesive and the primer solution.

After the adhesive layer and the fibers 2M are disposed on the inner surface 11B, at least a part of the annular structure 10 is disposed so as to face the inner surface 11B of the tread rubber layer 11. The outer surface 10A of the annular structure 10 and the inner surface 11B of the tread rubber layer 11 are joined together with the adhesive layer placed between the outer surface 10A and the inner surface 11B. The tread rubber layer 11 and the annular structure 10 are joined together in a state in which the plurality of fibers 2M are disposed between the inner surface 11B of the tread rubber layer 11 and the outer surface 10A of the annular structure 10.

In the present embodiment also, due to the fibers 2M disposed between the annular structure 10 and the tread rubber layer 11, the gas between the annular structure 10 and the tread rubber layer 11 is diffused between the annular structure 10 and the tread rubber layer 11. Thus, the generation of the gas space between the annular structure 10 and the tread rubber layer 11 is suppressed.

Fifteenth Embodiment

Figure 18:
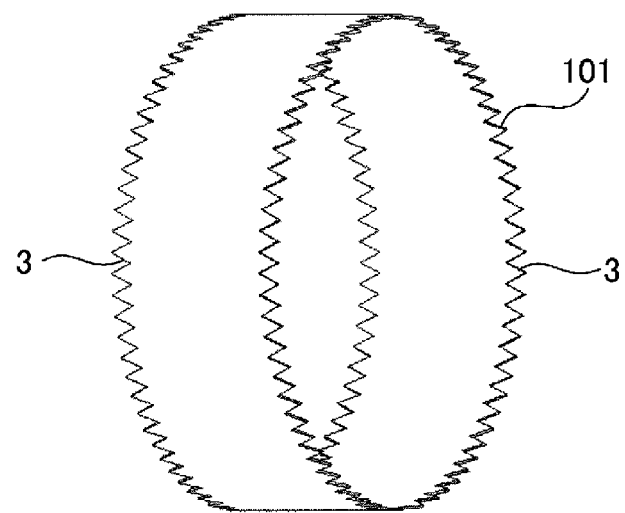
FIG. 18 is a diagram schematically illustrating one example of an annular structure according to a fifteenth embodiment.

A fifteenth embodiment will be described. In the embodiments described below, examples of the annular structure will be described. FIG. 18 is a perspective view illustrating one example of an annular structure 101 according to the present embodiment. In FIG. 18, the annular structure 101 has recesses and protrusions 3. The recesses and protrusions 3 are provided on each side of the annular structure 101 in the width direction. Protrusions of the recesses and protrusions 3 are sharply pointed. The recesses and protrusions 3 form a so-called saw blade shape. When at least a part of the tread rubber layer 11 is disposed on each side of the annular structure 101 in the width direction, the recesses and protrusions 3 can bite into the tread rubber layer 11. As a result, joining between the annular structure 101 and the tread rubber layer 11 is strengthened.

Sixteenth Embodiment

Figure 19:
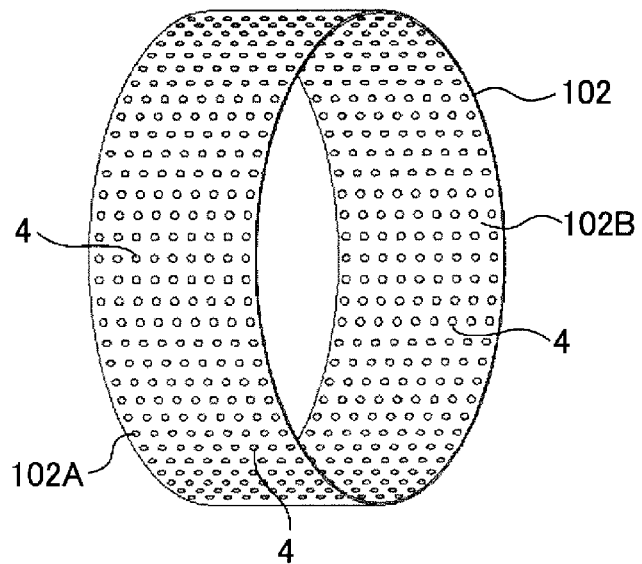
FIG. 19 is a diagram schematically illustrating one example of an annular structure according to a sixteenth embodiment.

A sixteenth embodiment will be described. FIG. 19 is a perspective view illustrating one example of an annular structure 102 according to the present embodiment. In FIG. 19, the annular structure 102 has an outer surface 102A, an inner surface 102B, and a plurality of through holes 4 that penetrate the outer surface 102A and the inner surface 102B.

In the present embodiment, a plurality of the through holes 4 are disposed with an equal interval between each other in the width direction of the annular structure 102. Further, the plurality of through holes 4 are disposed with an equal interval between each other in the circumferential direction of the annular structure 102. The plurality of through holes 4 are formed at an equal density in both the width direction and the circumferential direction of the annular structure 102.

In the present embodiment, at least a part of the tread rubber layer 11, which is joined to the outer surface 102A of the annular structure 102, can come into contact with the carcass portion 12, which is joined to the inner surface 102B of the annular structure 102, via the through holes 4. When the adhesive (adhesive layer) is provided on at least one of the inner surface 11B of the tread rubber layer 11 and the outer surface 12A of the carcass portion 12, at least a part of the inner surface 11B of the tread rubber layer 11 and the outer surface 12A of the carcass layer 12 are joined together by the adhesive (adhesive layer) via the through holes 4. As a result, joining between the tread rubber layer 11 and the annular structure 102 and joining between the annular structure 102 and the carcass portion 12 are each strengthened. Further, due to the through holes 4, diffusion of the gas between the tread rubber layer 11 and the annular structure 102 and diffusion of the gas between the annular structure 102 and the carcass portion 12 are each accelerated. Thus, the generation of the gas space is suppressed between the tread rubber layer 11 and the annular structure 102 and between the annular structure 102 and the carcass portion 12.

Seventeenth Embodiment

Figure 20:
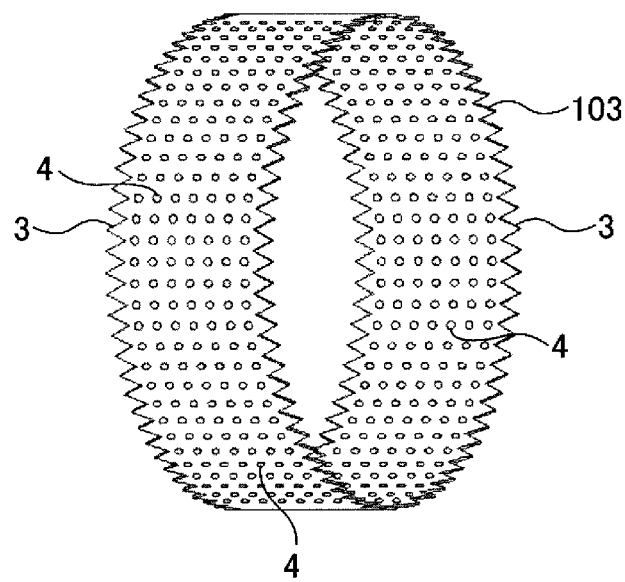
FIG. 20 is a diagram schematically illustrating one example of an annular structure according to a seventeenth embodiment.

A seventeenth embodiment will be described. FIG. 20 is a perspective view illustrating one example of an annular structure 103 according to the present embodiment. In FIG. 20, the annular structure 103 has the recesses and protrusions 3 and the plurality of through holes 4. The constituents described with reference to FIG. 18 and the constituents described with reference to FIG. 19 may be combined in this manner.

Eighteenth Embodiment

Figure 21:
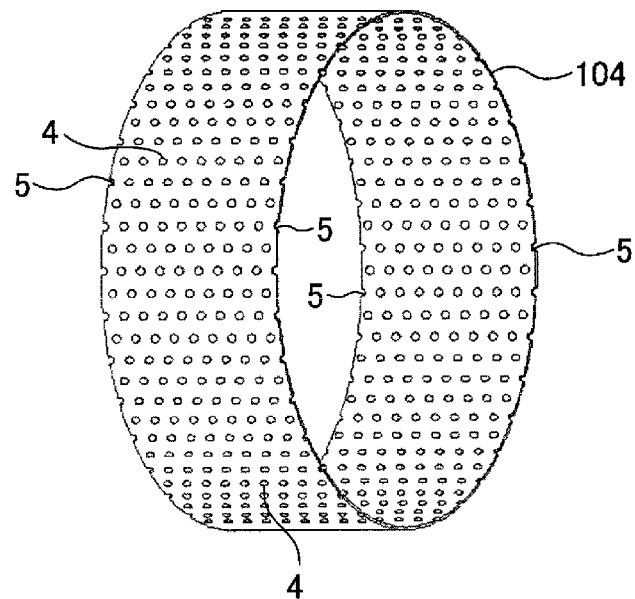
FIG. 21 is a diagram schematically illustrating one example of an annular structure according to an eighteenth embodiment.

An eighteenth embodiment will be described. FIG. 21 is a perspective view illustrating one example of an annular structure 104 according to the present embodiment. In FIG. 21, the annular structure 104 has the plurality of through holes 4. Further, the annular structure 104 has a recess portion 5. The recess portion 5 may be referred to as a notched portion 5. The recess portion 5 is provided on each side of the annular structure 104 in the width direction. A plurality of the recess portions 5 are disposed with an interval between each other in the circumferential direction of the annular structure 104. When at least a part of the tread rubber layer 11 is disposed on each side of the annular structure 104 in the width direction, at least a part of the tread rubber layer 11 can be wedged into the recess portion 5. As a result, the joining between the annular structure 104 and the tread rubber layer 11 is strengthened.

Nineteenth Embodiment

Figure 22:
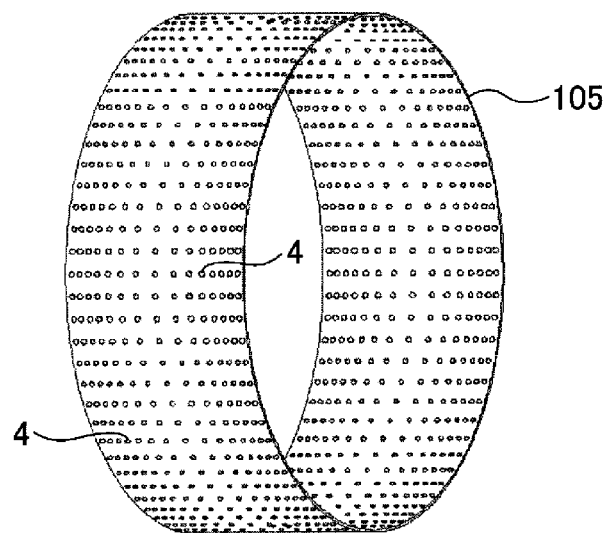
FIG. 22 is a diagram schematically illustrating one example of an annular structure according to a nineteenth embodiment.

A nineteenth embodiment will be described. FIG. 22 is a perspective view illustrating one example of an annular structure 105 according to the present embodiment. In FIG. 22, the annular structure 105 has the plurality of through holes 4. Further, the plurality of through holes 4 are disposed with an equal interval between each other in the circumferential direction of the annular structure 105. The through holes 4 are disposed with an interval between each other in the width direction of the annular structure 105. Further, the plurality of through holes 4 are disposed with an unequal interval between each other in the width direction of the annular structure 105. In the present embodiment, in the width direction of the annular structure 105, an interval between the through holes 4 disposed in the vicinity of edges of the annular structure 105 is smaller than an interval between the through holes 4 disposed in a central section of the annular structure 105. Note that, in the width direction of the annular structure 105, the interval between the through holes 4 disposed in the vicinity of the edges of the annular structure 105 may be larger than the interval between the through holes 4 disposed in the central section of the annular structure 105.

In the present embodiment also, due to the through holes 4, joining between the tread rubber layer 11 and the annular structure 105 and joining between the annular structure 105 and the carcass portion 12 are each strengthened. Further, due to the through holes 4, diffusion of the gas between the tread rubber layer 11 and the annular structure 105 and diffusion of the gas between the annular structure 105 and the carcass portion 12 are each accelerated. Thus, the generation of the gas space is suppressed between the tread rubber layer 11 and the annular structure 105 and between the annular structure 105 the carcass portion 12.

Twentieth Embodiment

Figure 23:
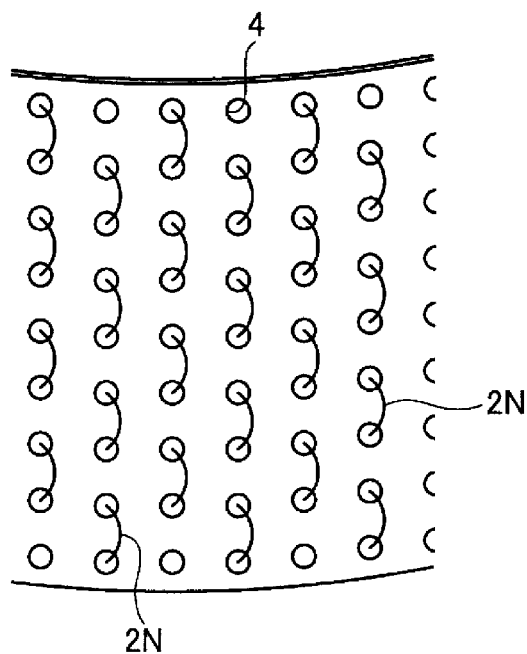
FIG. 23 is a diagram schematically illustrating a part of the tire according to a twentieth embodiment.

A twentieth embodiment will be described. FIG. 23 is a diagram illustrating one example of a fiber 2N according to the present embodiment. In the present embodiment, an example will be described in which the fiber 2N is disposed in an annular structure having the through holes 4 (such as the annular structure 102).

As illustrated in FIG. 23, the fiber 2N is inserted into a through hole 4 from an outer surface side of the annular structure, and the fiber 2N is inserted into another through hole 4 adjacent to the through hole 4 from an inner surface side of the annular structure. Further, after the fiber 2N is inserted into the through hole 4 from the inner surface side of the annular structure, the fiber 2N is inserted into another through hole 4 adjacent to the through hole 4 from the outer surface side of the annular structure. Specifically, the fiber 2N is sequentially inserted into the plurality of through holes 4 so that a state in which at least a part of the fiber 2N is disposed on the outer surface side of the annular structure and a state in which at least a part of the fiber 2N is disposed on the inner surface side of the annular structure are obtained repeatedly in an alternating manner.

According to the present embodiment, because the through holes 4 are provided in the annular structure, the fiber 2N is disposed between the outer surface of the annular structure and the tread rubber layer 11, and the fiber 2N is disposed between the inner surface of the annular structure and the carcass layer 12, the generation of the gas space between the tread rubber layer 11 and the annular structure, and thus the generation of the gas space between the annular structure and the carcass portion 12 are suppressed.

Twenty-First Embodiment

Figure 24:
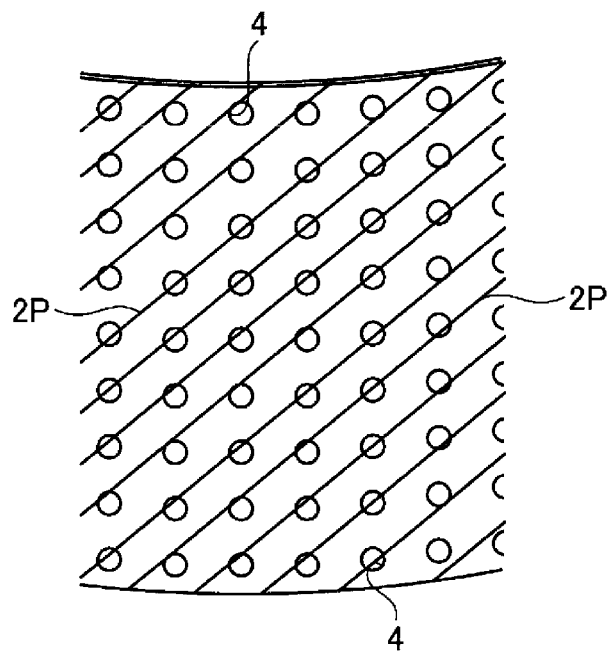
FIG. 24 is a diagram schematically illustrating a part of the tire according to a twenty-first embodiment.

A twenty-first embodiment will be described. FIG. 24 is a diagram illustrating one example of fibers 2P according to the present embodiment. In the present embodiment, an example will be described in which the fibers 2P are disposed on the annular structure having the through holes 4 (such as the annular structure 102).

As illustrated in FIG. 24, the fibers 2P are disposed on the outer surface of the annular structure with an interval between each other. The fibers 2P are disposed so as to pass over at least some openings of the plurality of through holes 4. Note that the fibers 2P may be disposed on the inner surface of the annular structure with an interval between each other.

In the present embodiment also, due to effects of the through holes 4 and the fibers 2P, the generation of the gas space between the tread rubber layer 11 and the annular structure, and the generation of the gas space between the annular structure and the carcass portion 12 are suppressed.

Twenty-Second Embodiment

Figures 25, 26:
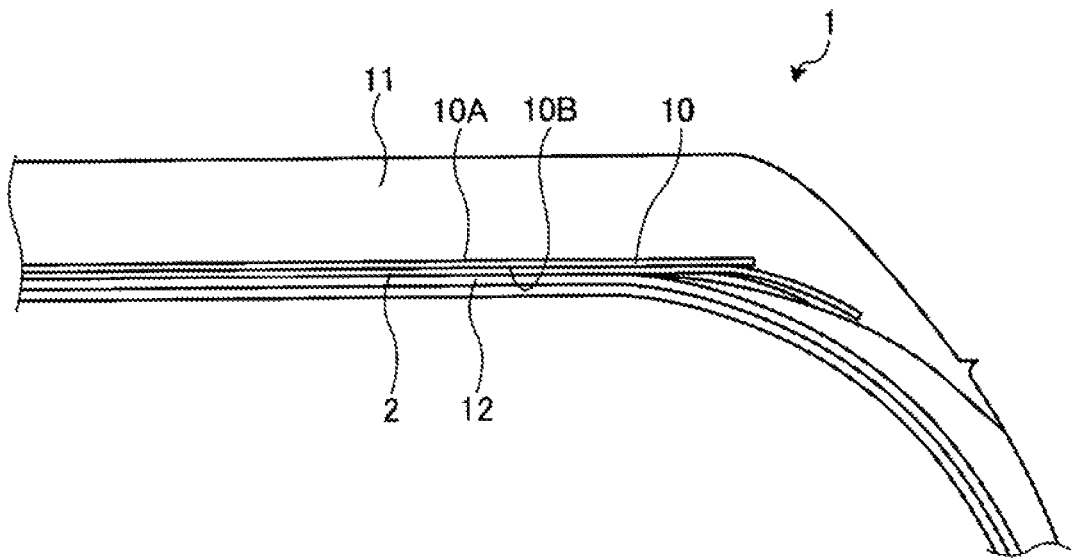
FIG. 25 is a diagram schematically illustrating a part of the tire according to a twenty-second embodiment.
FIG. 26 is a diagram showing one example of test results of a working example and comparative examples according to the present technology.

A twenty-second embodiment will be described. FIG. 25 is a schematic view illustrating one example of the tire 1 according to the present embodiment. As illustrated in FIG. 25, the tire 1 is provided with the cylindrical annular structure 10 having the outer surface 10A and the inner surface 10B, the carcass portion 12 at least a part of which is disposed so as to face the inner surface 10B of the annular structure 10, the tread rubber layer 11 at least a part of which is disposed so as to face the outer surface 10A of the annular structure 10, and the fiber 2 that is disposed between the annular structure 10 and the carcass portion 12 so as to suppress the gas space from being generated between the annular structure 10 and the carcass portion 12. A plurality of the fibers 2 are disposed between the annular structure 10 and the carcass portion 12. In the example illustrated in FIG. 25, no fiber is disposed between the tread rubber layer 11 and the annular structure 10. As illustrated in FIG. 25, the fiber need not necessarily be disposed between the tread rubber layer 11 and the annular structure 10, and the fibers 2 may be disposed between the annular structure 10 and the carcass portion 12. According to the present embodiment, at least the generation of the gas space between the annular structure 10 and the carcass portion 12 is suppressed.

In the present embodiment, the fibers 2 may be disposed so as to surround the rotational axis J. The fibers 2 may be disposed so as to be in parallel with the rotational axis J. The fibers 2 may have a dimension less than the dimension of the annular structure 10 in the direction parallel to the rotational axis J and the dimension of the annular structure 10 in the direction around the rotational axis J. The fibers 2 may be disposed at an equal density in both the direction parallel to the rotational axis J and the direction around the rotational axis J.

In the present embodiment, at least one of the fibers 2 may be disposed in a 100 mm square region on the inner surface 10B of the annular structure 10, while five or more of the fibers 2 need not necessarily be disposed in a 10 mm square region on the inner surface 10B of the annular structure 10.

Note that the fibers 2 may be disposed between the annular structure having the through holes 4 (such as the annular structure 102) and the carcass portion 12, while no fiber is disposed between the annular structure having the through holes 4 (such as the annular structure 102) and the tread rubber layer 11.

In the molding step (step S2) of the tire 1 illustrated in FIG. 25, a step of disposing at least a part of the tread rubber layer 11 so as to face the outer surface 10A of the annular structure 10, and a step of disposing the fiber 2 between at least a part of the carcass portion 12 and the inner surface 10B of the annular structure 10 to cause at least the part of the carcass portion 12 and the inner surface 10B of the annular structure 10 to face each other are performed. In the vulcanization step (step S3), a step of vulcanizing the carcass portion 12 in a state in which the fibers 2 are disposed between the annular structure 10 and the carcass portion 12, and joining the carcass portion 12 and the annular structure 10 while suppressing generation of a gas space between the annular structure 10 and the carcass portion 12.

After the annular structure 10 and the tread rubber layer 11 are joined together in the molding step (step S2) of the tire 1 illustrated in FIG. 25, the annular structure 10 and the carcass portion 12 may be joined together in a state in which the fibers 2 are disposed between the annular structure 10 and the carcass portion 12. Note that, in a state in which the fibers 2 are disposed between the annular structure 10 and the carcass portion 12, the annular structure 10 and the tread rubber layer 11 may be joined together after the annular structure 10 and the carcass portion 12 are joined together. Note that the joining between the annular structure 10 and the carcass portion 12 and the joining between the annular structure 10 and the tread rubber layer 11 may be performed simultaneously.

Note that when the annular structure 10 and the carcass portion 12 are joined together in a state in which the fibers 2 are disposed between the annular structure 10 and the carcass portion 12, the carcass portion 12 and the inner surface 10B of the annular structure 10 may be caused to face each other after causing the fibers 2 and the inner surface 10B of the annular structure 10 to face each other, or the fibers 2 and the inner surface 10B of the annular structure 10 may be caused to face each other after causing the carcass portion 12 and the inner surface 10B of the annular structure 10 to face each other. Alternatively, the carcass portion 12 and the inner surface 10B of the annular structure 10 may be caused to face each other simultaneously with the fibers 2 and the inner surface 10B of the annular structure 10 being caused to face each other.

Note that, in each of the embodiments described above, the carcass portion 12 need not necessarily face the inner surface 10B of the annular structure 10. The carcass portion 12 need not necessarily be disposed so as to face the inner surface 10B of the annular structure 10, but may be disposed only on the outer side of the annular structure 10 in the Y-axis direction (the width direction of the tire 1).

EXAMPLES

Next, a working example according to the present technology will be described. The present inventors produced the tire 1 having the fiber 2 according to the above-described embodiment, and measured the adhesive strength between the annular structure 10 and the tread rubber layer 11 according to the present embodiment by carrying out a separation test on the annular structure 10 and the tread rubber layer 11 of the tire 1 according to the present embodiment. Further, the present inventors produced tires according to comparative examples, and measured the adhesive strength between the annular structure 10 and the tread rubber layer 11 according to the comparative examples by carrying out the separation test on the annular structure 10 and the tread rubber layer 11 of the tire according to the comparative examples.

A size of the tire 1 according to the present embodiment and of the tires according to the comparative examples was 195/65R15. In the separation test, values indexing the adhesive strength (adhesive force) according to JIS (Japanese Industrial Standards) K6256 were derived.

FIG. 26 shows measurement results for the tire 1 according to Working Example 1 of the present technology, measurement results for the tire according to Comparative Example 1, measurement results for the tire according to Comparative Example 2, and measurement results for the tire according to Comparative Example 3.

The tire 1 according to Working Example 1 has the plurality of fibers 2 that are disposed between the annular structure 10 and the tread rubber layer 11. As described with reference to FIG. 3, etc., each of the plurality of fibers 2 is disposed in parallel with the rotational axis J. The plurality of fibers 2 are disposed with an equal interval between each other in the circumferential direction (the direction θY) of the outer surface 10A of the annular structure 10. The interval between the fibers 2 is 15 mm.

The tire according to Comparative Example 1 has the annular structure 10 and the tread rubber layer 11, but does not have any fiber. Specifically, in the tire according to Comparative Example 1, the fiber does not exist between the annular structure 10 and the tread rubber layer 11.

The tire according to Comparative Example 2 has the plurality of fibers 2 that are disposed between the annular structure 10 and the tread rubber layer 11. Each of the plurality of fibers 2 is disposed in parallel with the rotational axis J. The plurality of fibers 2 are disposed with an equal interval between each other in the circumferential direction (the direction θY) of the outer surface 10A of the annular structure 10. The interval between the fibers 2 is 2 mm.

The tire according to Comparative Example 3 has the plurality of fibers 2 that are disposed between the annular structure 10 and the tread rubber layer 11. Each of the plurality of fibers 2 is disposed in parallel with the rotational axis J. The plurality of fibers 2 are disposed with an equal interval between each other in the circumferential direction (the direction θY) of the outer surface 10A of the annular structure 10. The interval between the fibers 2 is 110 mm.

As shown in FIG. 26, the adhesive strength (adhesive force) between the annular structure 10 and the tread rubber layer 11 according to Working Example 1 is 117. The adhesive strength (adhesive force) between the annular structure 10 and the tread rubber layer 11 according to Comparative Example 1 is 100. The adhesive strength (adhesive force) between the annular structure 10 and the tread rubber layer 11 according to Comparative Example 2 is 87. The adhesive strength (adhesive force) between the annular structure 10 and the tread rubber layer 11 according to Comparative Example 3 is 96.

As described above, it was found that the adhesive strength according to Working Example 1 was greater than the respective adhesive strengths of Comparative Example 1, Comparative Example 2, and Comparative Example 3. Specifically, it was found that the adhesive strength between the annular structure 10 and the tread rubber layer 11 could be improved by the fibers 2 according to the present technology. Further, based on the results of Comparative Example 2, it was found that even when the fibers 2 were provided, a sufficient adhesive strength could not be obtained if the interval between the fibers 2 was too small. Further, based on the results of Comparative Example 3, it was found that even when the fibers 2 were provided, a sufficient adhesive strength could not be obtained if the interval between the fibers 2 was too large.

What is claimed is:

1. A pneumatic tire comprising:
a cylindrical annular structure that is disposed around a rotational axis and that has an outer surface and an inner surface, wherein the annular structure is made of a single metal plate member;
a carcass portion at least a part of which is disposed on an outer side of the annular structure in a direction parallel to the rotational axis, the carcass portion having a cord covered by rubber;
a rubber layer having an inner surface disposed so as to face the outer surface of the annular structure, the rubber layer including a tread portion; and
at least one fiber so as to suppress generation of a gas space between the annular structure and the rubber layer, a diameter of the at least one fiber being not less than 0.03 mm and not greater than 1.00 mm; wherein
the outer surface of the annular structure and the inner surface of the rubber layer are in contact with each other;
the fiber is disposed on a contact surface between the outer surface of the annular structure and the inner surface of the rubber layer;
at least a part of the carcass portion is disposed so as to face the inner surface of the annular structure; and
the at least one fiber is disposed between the annular structure and the carcass portion so as to suppress generation of a gas space between the annular structure and the carcass portion.

2. The pneumatic tire according to claim 1, wherein a plurality of fibers are disposed between the annular structure and the rubber layer.

3. The pneumatic tire according to claim 1, wherein a plurality of the fibers are disposed between the annular structure and the carcass portion.

4. The pneumatic tire according to claim 1, wherein at least one of the fibers is disposed in a 100 mm square region on a surface of the annular structure, and five or more of the fibers are not disposed in a 10 mm square region on the surface of the annular structure.

5. The pneumatic tire according to claim 1, wherein a linear density of the at least one fiber is not less than $1\times10^{-6}$ g/mm and not greater than $1\times10^{-4}$ g/mm.

6. The pneumatic tire according to claim 1, wherein the annular structure has a plurality of through holes that penetrate the outer surface and the inner surface.

7. The pneumatic tire according to claim 1, wherein the at least one fiber is disposed so as to surround the rotational axis.

8. The pneumatic tire according to claim 1, wherein the at least one fiber is disposed so as to be in parallel with the rotational axis.

9. The pneumatic tire according to claim 1, wherein:
a distance between adjacent fibers is set to be 10 mm or more and 50 mm or less,
one or more and four or less of the fibers are disposed in a 100 mm square region on the outer surface of the annular structure, and
a linear density of the at least one fiber is $1 \times 10^{-6}$ g/mm or more and $1 \times 10^{-4}$ g/mm or less.

10. The pneumatic tire according to claim 1, wherein the at least one fiber is a thread-like member formed by arranging and twisting at least one of natural fiber or chemical fiber.

11. The pneumatic tire according to claim 1, wherein the at least one fiber is a thread-like member formed by arranging and twisting at least one of natural fiber or chemical fiber.

12. The pneumatic tire according to claim 1, wherein a dimension of the at least one fiber is identical or larger than a dimension of the annular structure in the direction parallel to the rotational axis.

13. A pneumatic tire, comprising:
a cylindrical annular structure that is disposed around a rotational axis and that has an outer surface and an inner surface, wherein the annular structure is made of a single metal plate member;
a carcass portion having an outer surface disposed so as to face the inner surface of the annular structure, the carcass portion having a cord covered by rubber;
a rubber layer having an inner surface disposed so as to face the outer surface of the annular structure, the rubber layer including a tread portion; and
at least one fiber so as to suppress generation of a gas space between the annular structure and the carcass portion; wherein:
the inner surface of the annular structure and the outer surface of the carcass portion are in contact with each other; and
the at least one fiber is disposed on a contact surface between the inner surface of the annular structure and the outer surface of the carcass portion.

14. The pneumatic tire according to claim 13, wherein a plurality of fibers are disposed between the annular structure and the carcass portion.

15. The pneumatic tire according to claim 13, wherein at least one of the fibers is disposed in a 100 mm square region on a surface of the annular structure, and five or more of the fibers are not disposed in a 10 mm square region on the surface of the annular structure.

16. The pneumatic tire according to claim 13, wherein a linear density of the at least one fiber is not less than $1 \times 10^{-6}$ g/mm and not greater than $1 \times 10^{-4}$ g/mm, and
a diameter of the at least one fiber is not less than 0.03 mm and not greater than 1.00 mm.

17. The pneumatic tire according to claim 13, wherein the annular structure has a plurality of through holes that penetrate the outer surface and the inner surface.

18. The pneumatic tire according to claim 13, wherein the at least one fiber is disposed so as to surround the rotational axis.

19. The pneumatic tire according to claim 13, wherein the at least one fiber is disposed so as to be in parallel with the rotational axis.

20. The pneumatic tire according to claim 13, wherein the at least one fiber has a dimension less than a dimension of the annular structure in the direction parallel to the rotational axis and a dimension of the annular structure in a direction around the rotational axis, and a plurality of the fibers are disposed at an equal density in both the direction parallel to the rotational axis and the direction around the rotational axis.

21. The pneumatic tire according to claim 13, wherein:
a distance between adjacent fibers is set to be 10 mm or more and 50 mm or less,
one or more and four or less of the fibers are disposed in a 100 mm square region on the inner surface of the annular structure,
a linear density of the at least one fiber is $1 \times 10^{-6}$ g/mm or more and $1 \times 10^{-4}$ g/mm or less, and
a diameter of the at least one fiber is 0.03 mm or more and 1.00 mm or less.

22. The pneumatic tire according to claim 13, wherein a dimension of the at least one fiber is identical or larger than a dimension of the annular structure in the direction parallel to the rotational axis.

23. A pneumatic tire comprising:
a cylindrical annular structure that is disposed around a rotational axis and that has an outer surface and an inner surface, wherein the annular structure is made of a single plate member;
a carcass portion at least a part of which is disposed on an outer side of the annular structure in a direction parallel to the rotational axis, the carcass portion having a cord covered by rubber, and at least a part of the carcass portion being disposed so as to face the inner surface of the annular structure;
a rubber layer having an inner surface disposed so as to face the outer surface of the annular structure, the rubber layer including a tread portion;
a first fiber so as to suppress generation of a gas space between the annular structure and the rubber layer; and
a second fiber so as to suppress generation of a gas space between the annular structure and the carcass portion; wherein
the outer surface of the annular structure and the inner surface of the rubber layer are in contact with each other;
the inner surface of the annular structure and the outer surface of the carcass portion are in contact with each other;
the first fiber is disposed on a contact surface between the outer surface of the annular structure and the inner surface of the rubber layer; and
the second fiber is disposed on a contact surface between the inner surface of the annular structure and the outer surface of the carcass portion.

* * * * *